United States Patent
You et al.

(10) Patent No.: US 9,756,656 B2
(45) Date of Patent: Sep. 5, 2017

(54) METHOD AND USER EQUIPMENT FOR RECEIVING SIGNAL AND METHOD AND BASE STATION FOR TRANSMITTING SIGNAL

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/430,730

(22) PCT Filed: Jan. 9, 2014

(86) PCT No.: PCT/KR2014/000243
§ 371 (c)(1),
(2) Date: Mar. 24, 2015

(87) PCT Pub. No.: WO2014/109566
PCT Pub. Date: Jul. 17, 2014

(65) Prior Publication Data
US 2015/0257173 A1    Sep. 10, 2015

Related U.S. Application Data

(60) Provisional application No. 61/750,750, filed on Jan. 9, 2013, provisional application No. 61/752,444, filed
(Continued)

(51) Int. Cl.
*H04W 74/00*    (2009.01)
*H04L 1/18*    (2006.01)
(Continued)

(52) U.S. Cl.
CPC ........ *H04W 74/006* (2013.01); *H04B 17/318* (2015.01); *H04L 1/1864* (2013.01);
(Continued)

(58) Field of Classification Search
None
See application file for complete search history.

(56) References Cited

U.S. PATENT DOCUMENTS 9,300,447 B2 *    3/2016    Ahn .................... H04B 7/024
2009/0274086 A1 *    11/2009    Petrovic ............ H04J 11/0093
370/312
(Continued)

FOREIGN PATENT DOCUMENTS

KR    10-2008-0050219    6/2008
KR    10-2009-0061058    6/2009
(Continued)

OTHER PUBLICATIONS

PCT International Application No. PCT/KR2014/00243, Written Opinion of the International Searching Authority dated Apr. 28, 2014, 21 pages.
(Continued)

*Primary Examiner* — Tejis Daya
(74) *Attorney, Agent, or Firm* — Lee Hong Degerman Kang & Waimey

(57) ABSTRACT

The present invention provides a method and an apparatus for reducing the amount of upper layer signals. Also, the present invention provides a method and an apparatus comprising: defining a new identifier for transmitting an upper layer signal for user equipment in a specific mode; and transmitting the upper layer signal by means of scrambling by using the new identifier, transmitting along with an error detection sign by using the new identifier, transmitting by using a user equipment-specific reference signal by using the
(Continued)

new identifier, or transmitting based on control information transmitted by using the new identifier.

18 Claims, 14 Drawing Sheets

Related U.S. Application Data on Jan. 14, 2013, provisional application No. 61/877,295, filed on Sep. 13, 2013.

(51) Int. Cl.
| | | |
|---|---|---|
| *H04W 72/04* | (2009.01) | |
| *H04B 17/318* | (2015.01) | |
| *H04W 28/06* | (2009.01) | |
| *H04L 5/00* | (2006.01) | |
| *H04W 88/08* | (2009.01) | |

(52) U.S. Cl.
CPC .......... *H04L 5/0053* (2013.01); *H04L 5/0094* (2013.01); *H04W 72/044* (2013.01); *H04L 5/001* (2013.01); *H04L 5/0023* (2013.01); *H04L 5/0035* (2013.01); *H04L 5/0051* (2013.01); *H04W 28/06* (2013.01); *H04W 88/08* (2013.01)

(56) References Cited

U.S. PATENT DOCUMENTS

| | | | | |
|---|---|---|---|---|
| 2010/0105380 A1* | 4/2010 | Attar | ...................... | H04W 48/16 455/434 |
| 2010/0120452 A1* | 5/2010 | Somasundaram | .. | H04W 74/008 455/458 |
| 2010/0227569 A1* | 9/2010 | Bala | ...................... | H04L 5/0007 455/73 |
| 2010/0267366 A1* | 10/2010 | Du | ........................ | H04W 48/08 455/412.2 |
| 2010/0272004 A1* | 10/2010 | Maeda | .................. | H04L 5/0007 370/312 |
| 2010/0278131 A1 | 11/2010 | Jeong et al. | | |
| 2011/0075621 A1* | 3/2011 | Sung | ...................... | H04W 48/12 370/329 |
| 2011/0274102 A1* | 11/2011 | Kim | ...................... | H04L 1/0072 370/350 |
| 2011/0299449 A1* | 12/2011 | Kwon | ................... | H04L 5/0023 370/312 |
| 2012/0147844 A1* | 6/2012 | Kim | ........................ | H04L 5/001 370/330 |
| 2012/0157090 A1* | 6/2012 | Kim | ...................... | H04W 24/08 455/424 |
| 2012/0282965 A1* | 11/2012 | Kim | ...................... | H04W 48/06 455/515 |
| 2012/0289286 A1* | 11/2012 | Miki | ...................... | H04W 48/12 455/552.1 |
| 2012/0322453 A1* | 12/2012 | Weng | ................... | H04W 72/02 455/450 |
| 2012/0327894 A1* | 12/2012 | Axmon | ................. | H04W 48/12 370/330 |
| 2013/0077582 A1* | 3/2013 | Kim | ................... | H04W 74/006 370/329 |
| 2013/0083753 A1* | 4/2013 | Lee | ................... | H04W 72/0453 370/329 |
| 2013/0258938 A1* | 10/2013 | Sagfors | ................. | H04W 72/02 370/312 |
| 2013/0259009 A1* | 10/2013 | Berggren | .......... | H04W 72/0446 370/336 |

FOREIGN PATENT DOCUMENTS

| | | |
|---|---|---|
| WO | 2009/116751 | 9/2009 |
| WO | 2011/047357 | 4/2011 |
| WO | 2012/148076 | 11/2012 |

OTHER PUBLICATIONS

Pot International Application No. PCT/KR2014/00243, Written Opinion of the International Searching Authority dated Apr. 28, 2014, 14 pages.

European Patent Office Application Serial No. 14738233.7, Search Report dated Aug. 31, 2016, 8 pages.

\* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

FIG. 9
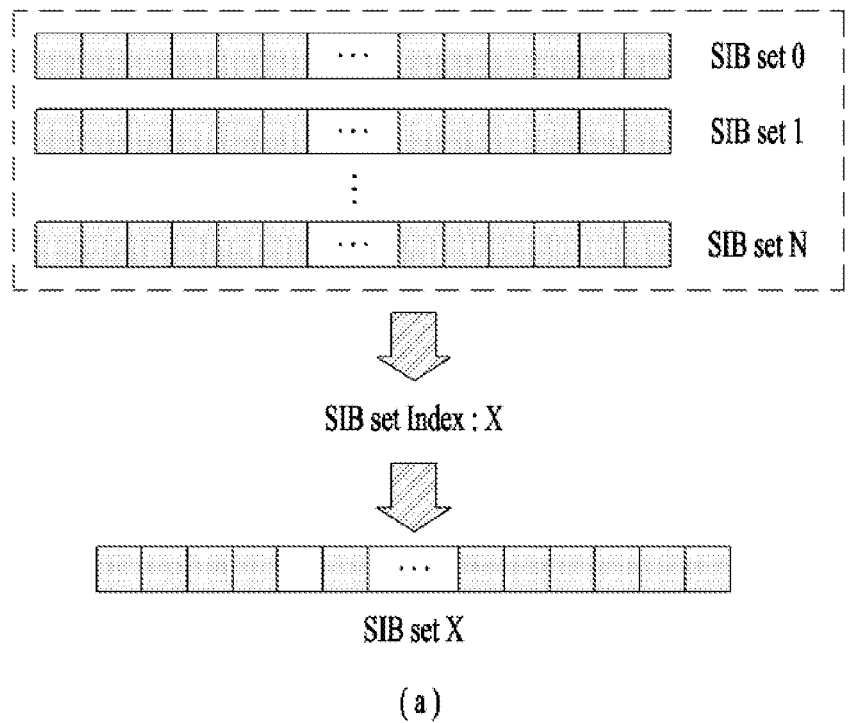
(a)
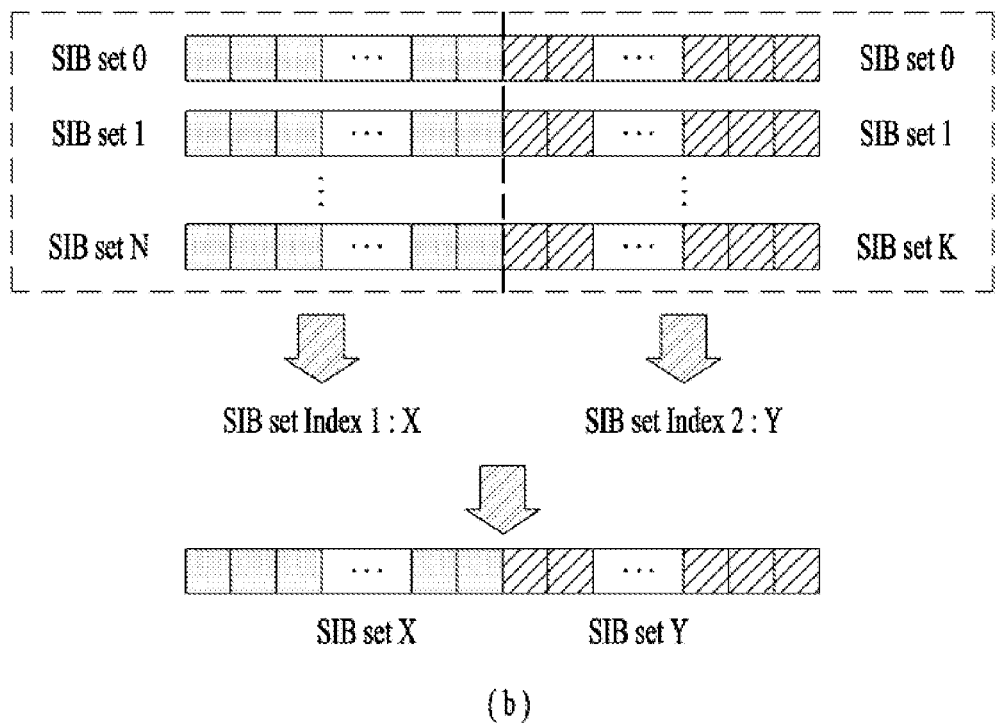
(b)

FIG. 12

| 0 | 1 | 2 | 3 | 4 | 5 | 6 | 7 | 8 | 9 |                    |                    |
|---|---|---|---|---|---|---|---|---|---|--------------------|--------------------|
| 0 | 1 | 0 | 0 | 0 | 1 | 0 | 0 | 0 | 0 | Value for parameter 1 | Value for parameter 5 |

Bitmap for each parameters

METHOD AND USER EQUIPMENT FOR RECEIVING SIGNAL AND METHOD AND BASE STATION FOR TRANSMITTING SIGNAL

CROSS-REFERENCE TO RELATED APPLICATIONS

This application is the National Stage filing under 35 U.S.C. 371 of International Application No. PCT/KR2014/000243, filed on Jan. 9, 2014, which claims the benefit of U.S. Provisional Application Ser. No. 61/750,750, filed on Jan. 9, 2013, 61/752,444, filed on Jan. 14, 2013 and 61/877,295, filed on Sep. 13, 2013, the contents of which are all hereby incorporated by reference herein in their entirety.

TECHNICAL FIELD

The present invention relates to a wireless communication system and, more particularly, to a method for transmitting or receiving a signal and an apparatus therefor.

TECHNICAL FIELD

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

The present invention proposes that a new identifier for transmitting a higher layer signal for a user equipment in a specific mode be defined. When the user equipment is set in the specific mode, the higher layer signal may be transmitted by being scrambled using the new identifier, transmitted along with an error detection code using the new identifier, transmitted using a user equipment specific reference signal using the new identifier, or transmitted based on control information transmitted using the new identifier.

The object of the present invention can be achieved by providing a method for receiving a signal in a user equipment, the method including receiving indication information indicating one parameter set among a plurality of parameter sets, and setting values included in the parameter set among the plurality of parameter sets as values of a higher layer signal based on the indication information, wherein the plurality of parameter sets have different values for a series of parameters, and wherein the indication information contains an index corresponding to the parameter set among a plurality of indexes corresponding to the plurality parameter sets in a manner of one-to-one correspondence.

In another aspect of the present invention, provided herein is a user equipment for receiving a signal, the user equipment including a radio frequency (RF) unit and a processor configured to control the RF unit. The processor may control the RF unit to receive indication information indicating one parameter set among a plurality of parameter sets. The processor may be configured to set values included in the parameter set among the plurality of parameter sets as values of a higher layer signal based on the indication information. The plurality of parameter sets may have different values for a series of parameters. The indication information may contain an index corresponding to the parameter set among a plurality of indexes corresponding to the plurality parameter sets in a manner of one-to-one correspondence.

In another aspect of the present invention, provided herein is a method for transmitting a signal in a base station, the method including transmitting to a user equipment indication information indicating a parameter set corresponding to values of a higher layer signal among a plurality of parameter sets, wherein the plurality of parameter sets have different values for a series of parameters, and when the indication information contains an index corresponding to the parameter set among a plurality of indexes corresponding to the plurality parameter sets in a manner of one-to-one correspondence.

In another aspect of the present invention, provided herein is a base station for transmitting a signal, the base station including a radio frequency (RF) unit and a processor configured to control the RF unit. The processor may control the RF unit to transmit to a user equipment indication information indicating a parameter set corresponding to values of a higher layer signal among a plurality of parameter sets. The plurality of parameter sets may have different values for a series of parameters. The indication information may contain an index corresponding to the parameter set among a plurality of indexes corresponding to the plurality parameter sets in a manner of one-to-one correspondence.

In each aspect of the present invention, the indication information may further contain a value of a parameter other than the series of parameters among parameters of the higher layer signal.

In each aspect of the present invention, information indicating a parameter to be replaced in the series of parameters and information indicating a replaced value of the parameter to be replaced may be further transmitted to the user equipment.

In each aspect of the present invention, the method may further include replacing a value corresponding to the parameter to be replaced among the values in the parameter set with the replaced value.

In each aspect of the present invention, the indication information may be received over a new physical broadcast channel (PBCH) configured separately from a legacy PBCH or a physical downlink shared channel (PDSCH) configured for the higher layer signal, using a new system information radio network temporary identifier (SI-RNTI) between a legacy SI-RNTI and the new SI-RNTI.

In another aspect of the present invention, provided herein is a method for receiving a signal in a user equipment, the method including receiving a higher layer signal over a physical downlink shared channel (PDSCH), wherein, when the user equipment is configured in a specific mode, the higher layer signal is received using a new system information radio network temporary identifier (SI-RNTI) configured for the specific mode between a legacy SI-RNTI and the new SI-RNTI.

In another aspect of the present invention, provided herein is a user equipment for receiving a signal, the user equipment including a radio frequency (RF) unit and a processor configured to control the RF unit. The processor may control the RF unit to receive a higher layer signal over a physical downlink shared channel (PDSCH). When the user equipment is configured in a specific mode, the higher layer signal may be received using a new system information radio network temporary identifier (SI-RNTI) configured for the specific mode between a legacy SI-RNTI and the new SI-RNTI.

In another aspect of the present invention, provided herein is a method for transmitting a signal, the method including transmitting a higher layer signal to a user equipment over a physical downlink shared channel (PDSCH).

When the user equipment is set in a specific mode, the higher layer signal is transmitted using a new system information radio network temporary identifier (SI-RNTI) configured for the specific mode between a legacy SI-RNTI and the new SI-RNTI.

In another aspect of the present invention, provided herein is a base station for transmitting a signal, the base station including a radio frequency (RF) unit and a processor configured to control the RF unit. The processor may control the RF unit to transmit a higher layer signal to a user equipment over a physical downlink shared channel (PDSCH). When the user equipment is configured in a specific mode, the higher layer signal may be transmitted using a new system information radio network temporary identifier (SI-RNTI) configured for the specific mode between a legacy SI-RNTI and the new SI-RNTI.

In each aspect of the present invention, resource block (RB) information indicating RBs allocated to the PDSCH and subframe configuration information indicating a subframe set bundled for the PDSCH may be further transmitted to the user equipment.

In each aspect of the present invention, the higher layer signal may be transmitted to the user equipment over the PDSCH in each of a plurality of subframes included in the bundled subframe set, based on the RB information and the subframe configuration information.

In each aspect of the present invention, the processor may be configured to determine whether the user equipment is configured in the specific mode based on at least one of a time duration for receiving a synchronization signal, a time duration for receiving physical broadcast channel (PBCH), a radio resource management (RRM) measurement result and a time duration for receiving a system information block.

The above technical solutions are merely some parts of the embodiments of the present invention and various embodiments into which the technical features of the present invention are incorporated can be derived and understood by persons skilled in the art from the following detailed description of the present invention.

Advantageous Effect

According to embodiments of the present invention, uplink/downlink signals may be efficiently transmitted/received. Accordingly, overall throughput of a wireless communication system is enhanced.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 illustrates a method for shortening parameters according to one embodiment of the present invention.

FIGS. 11 and 12 illustrate a method for shortening parameters according to one embodiment of the present invention.

MODE FOR CARRYING OUT THE INVENTION

Figure 1:
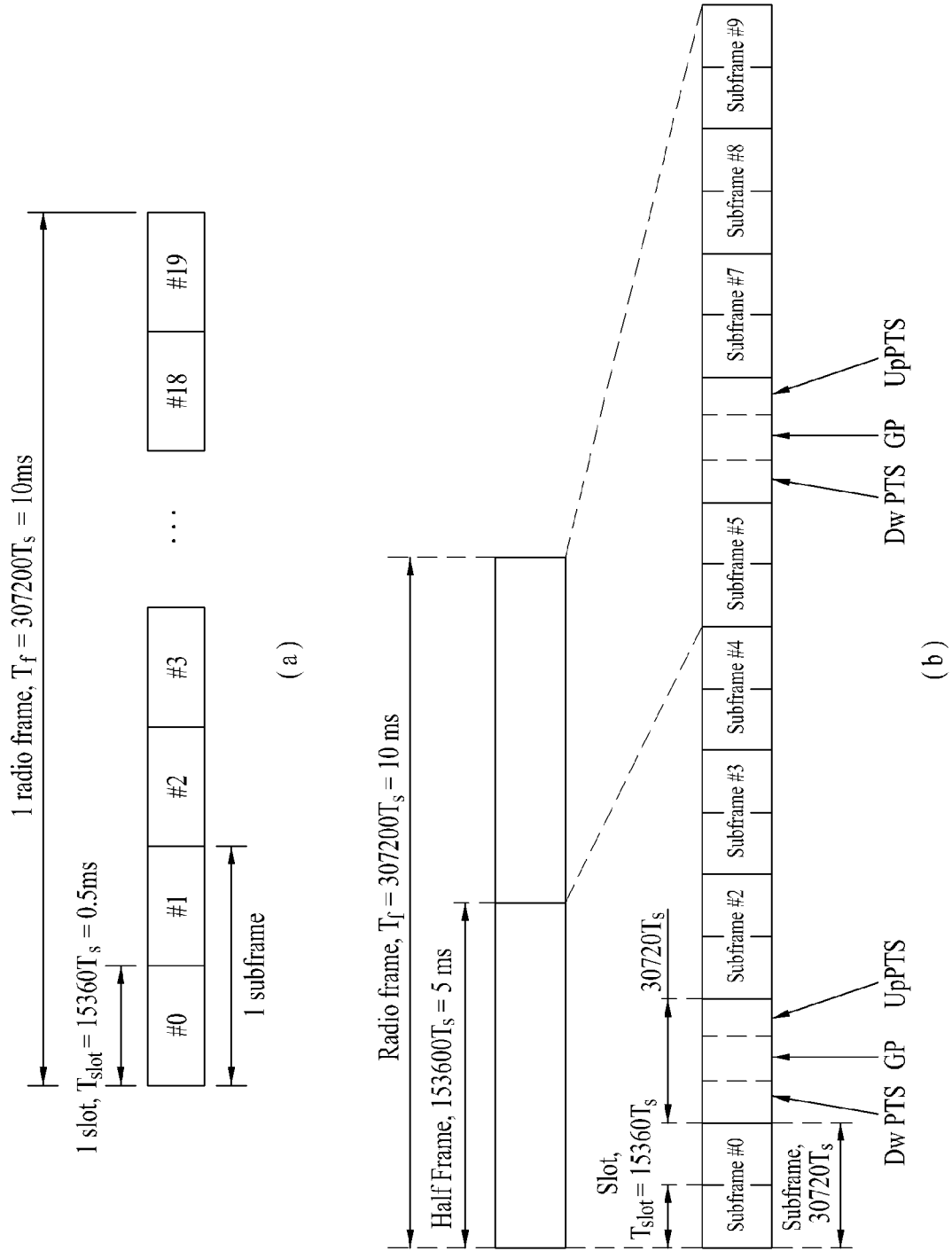
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both DMRS and UE-RS represent demodulation RSs, and thus the terms DMRS and UE-RS are used to refer to demodulation RSs.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
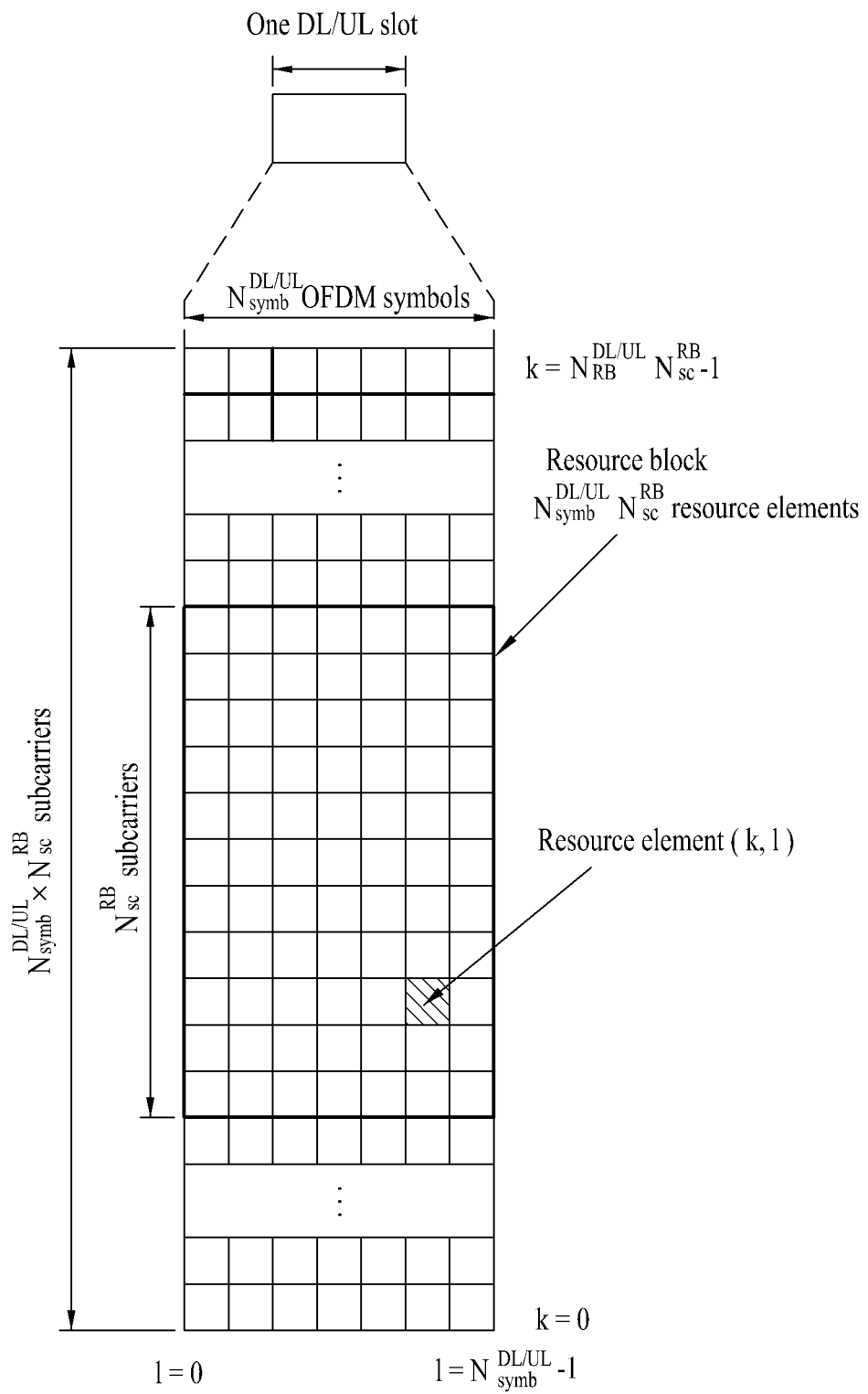
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
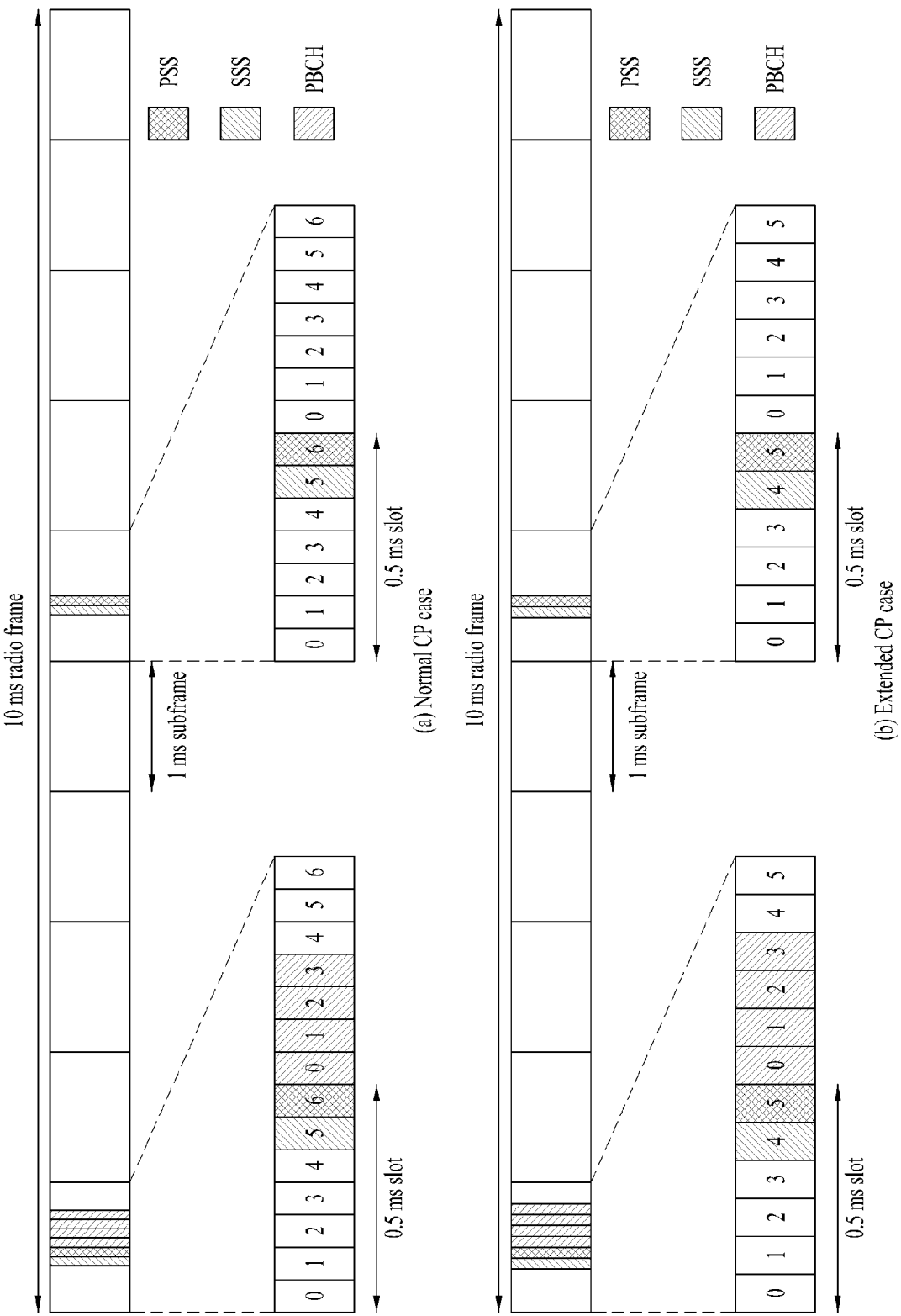
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ ($=3N^{(1)}_{ID} + N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \qquad \text{[Equation 2]}$$

where $N_{ZC}=63$ and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relationship, two correlations may be simultaneously performed. Here, conjugate symmetry indicates the relationship of the following Equation.

$$d_u(n)=(-1)^n(d_{N_{ZC}-u}(n))^*,$$

when $N_{ZC}$ is even number $$d_u(n)=(d_{N_{ZC}-u}(n))^*,$$ [Equation 2]

when $N_{ZC}$ is odd number

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n=0, 1, \ldots, 30 \\ e^{-j\frac{\pi u(n+1)(n+2)}{63}} & n=31, 32, \ldots, 61 \end{cases}$$ [Equation 3]

where the Zadoff-Chu root sequence index u is given by the following table.

TABLE 3

| $N^{(2)}_{ID}$ | Root index u |
| --- | --- |
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Thus, for cell search/re-search, the UE may receive the PSS and the SSS from the eNB to establish synchronization with the eNB and acquire information such as a cell identity (ID). Thereafter, the UE may receive broadcast information in a cell managed by the eNB over a PBCH.

The message content of the PBCH are expressed in a master information block (MIB) in a radio resource control (RRC) layer. Specifically, the message content of the PBCH is shown in Table 4.

TABLE 4

```
--vASN1START
MasterInformationBlock ::=    SEQUENCE {
    dl-Bandwidth                  ENUMERATED {
                                    n6, n15, n25, n50, n75, n100},
    phich-Config                  PHICH-Config,
    systemFrameNumber             BIT STRING (SIZE (8)),
    spare                         BIT STRING (SIZE (10))
}
-- ASN1STOP
```

As shown in Table 4, the MIB includes DL bandwidth (BW), PHICH configuration, and a system frame number SFN. For example, among the parameters of the MIB, the parameter dl-Bandwidth is a parameter indicating the number of RBs $N_{RB}$ on DL. This parameter may indicate a DL system bandwidth in a manner that n6 corresponds to 6 RBs, and n15 corresponds to 15 RBs. Among the parameters of the MIB, the parameter sytemFrameNumber defines 8 most significant bits of an SFN. The two least significant bits of the SFN may be implicitly obtained by decoding the PBCH. The timing of 40 ms PBCH TTI indicates two least significant bits. For example, in the 40 ms PBCH TTI, the first radio frame indicates 00, the second radio frame indicates 01, the third radio frame indicates 10, and the last radio frame indicates 11. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH. For example, masking sequences shown below may be used according to the number of antennas.

TABLE 5

| Number of transmit antenna ports at eNode-B | PBCH CRC mask $<x_{ant,\,0}, x_{ant,\,1}, \ldots, x_{ant,\,15}>$ |
| --- | --- |
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped to REs after cell-specific scrambling, modulation, layer mapping, and precoding are applied thereto.

FIG. 3 illustrates exemplary mapping based on one radio frame and, in fact, an encoded PBCH is mapped to 4 subframes substantially for 40 ms. The time of 40 ms is blind-detected and explicit signalling about 40 ms is not separately present. The PBCH is mapped to 4 OFDM symbols and 72 subcarriers in one subframe. The PBCH is not mapped to REs in which RSs for 4 transmit antennas are located regardless of the number of actual transmit antennas of the eNB. For reference, even in the frame structure applied to TDD, illustrated in FIG. 1(b), the PBCH is mapped to 4 subframes during 40 ms and is mapped to 4 OFDM symbols and 72 subcarriers in one subframe. In TDD, the PBCH may be located on OFDM symbols 0 to 3 of slot 1 (the rear slot of subframe 0) and slot 11 (the rear slot of subframe 5) among slots 0 to 19 of a radio frame.

When a UE accesses an eNB or a cell for the first time or does not have a radio resource allocated for transmission of a signal to the eNB or the cell, the UE may perform a random access procedure. To perform the random access procedure, the UE may transmit a specific sequence over a PRACH as a random access preamble, and receive a response message for the random access preamble over a PDCCH and/or a PDSCH corresponding to the PDCCH. Thereby, a radio resource necessary for signal transmission may be allocated to the UE. In the random access procedure, a UE identifier may be configured for the UE. For example, a cell radio network temporary identifier (C-RNTI) may identify the UE in a cell, and may be temporary, semi-persistent or permanent. A temporary C-RNTI may be allocated in a temporary access process, and may become a permanent C-RNTI after contention is resolved. A semi-persistent C-RNTI is used to schedule semi-persistent resources through a PDCCH. The semi-persistent C-RNTI is also called a semi-persistent scheduling (SPS)C-RNTI. A permanent C-RNTI has a C-RNTI value allocated after contention is resolved in the random access procedure, and is used to schedule a dynamic resource.

Figure 4:
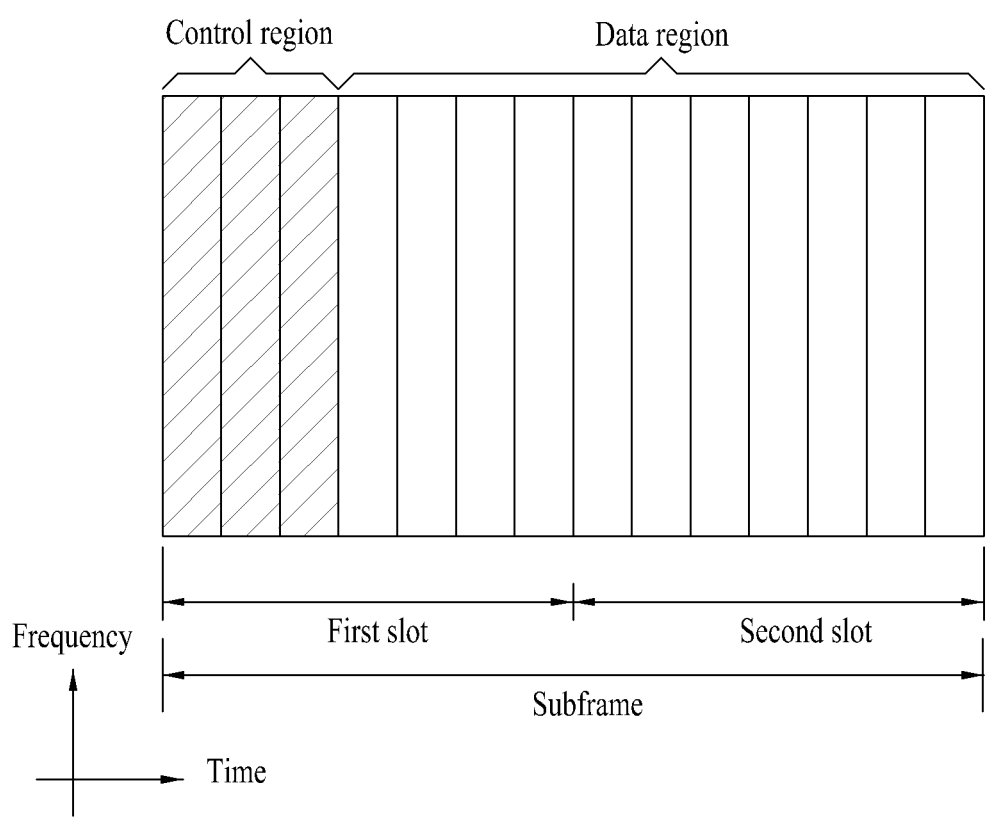
FIG. 4 illustrates the structure of a DL subframe used in a wireless communication system.

FIG. 4 illustrates the structure of a DL subframe used in a wireless communication system.

A DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. For example, a PDCCH including n consecutive CCEs may be initiated only on CCEs satisfying 'i mod n=0'. Herein, i denotes a CCE index (or a CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In order for the receiving device to restore a signal transmitted by the transmitting device, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, demodulation may be viewed as a part of the decoding process. In the present invention, the terms demodulation and decoding are used interchangeably.

Figure 5:
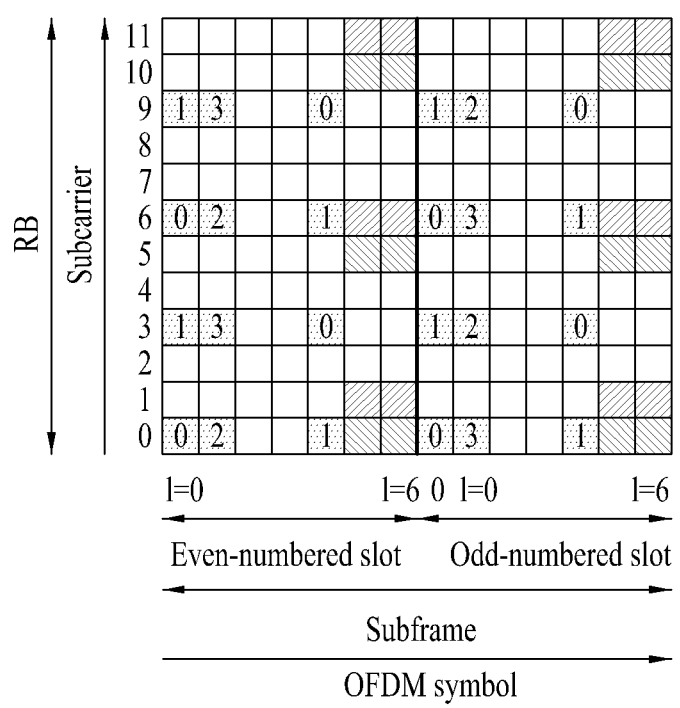
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

UE-RSs are transmitted on antenna port(s) p=5, p=7, p=8 or p=7, 8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

Figure 7:
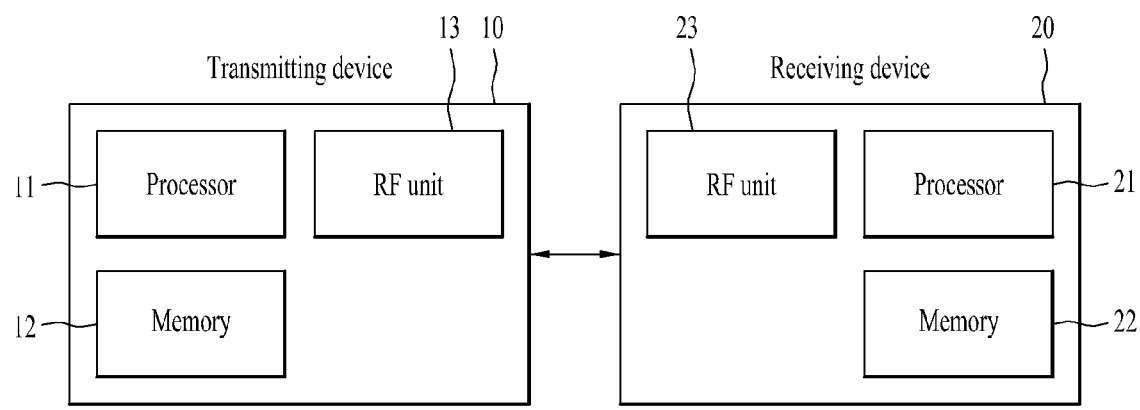
FIG. 7 is a block diagram illustrating elements of a transmitting device 10 and a receiving device 20 for implementing the present invention.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7, 8, . . . , v+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 4]}$$

where $w_p(i)$, l', m' are given as follows.

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases} \quad \text{[Equation 5]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $n_s$ is the slot number within a radio frame and an integer among 0 to 19. The sequence $\bar{w}_p(i)$ for normal CP is given according to the following equation.

TABLE 6

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , v+6}, the UE-RS sequence r(m) is defined as follows $$r(m) = \frac{1}{\sqrt{2}}(1 - 2 \cdot c(2m)) + j\frac{1}{\sqrt{2}}(1 - 2 \cdot c(2m+1)), \quad \text{[Equation 6]}$$

-continued $$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(fn) of length $M_{PN}$, where n=0, 1, . . . , $M_{PN}$−1, is defined by the following equation.

$$c(n) = (x_1(n+N_C) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 7]}$$

where $N_C$=1600 and the first m-sequence is initialized with $x_1(0)=1$, $x_1(n)=0$, n=1, 2, . . . , 30. The initialization of the second m-sequence is denoted by $c_{init} = \sum_{i=0}^{30} x_2(i) \cdot 2^i$ with the value depending on the application of the sequence.

In Equation 6, the pseudo-random sequence generator for generating c(i) is initialized with $c_{init}$ at the start of each subframe according to the following equation.

$$c_{init} = (\lfloor n_s/2 \rfloor + 1) \cdot (2n_{ID}^{(nSCID)} + 1) \cdot 2^{16} + n^{SCID} \quad \text{[Equation 8]}$$

In Equation 8, the quantities $n^{(i)}_{ID}$, i=0,1, which is corresponding to $n_{ID}^{(nSCID)}$, is given) by a physical layer cell identifier $N^{cell}_{ID}$ if no value for $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 8, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

In case of DCI format 2B, $n_{SCID}$ is indicated by the scrambling entity field according to the following table.

TABLE 7

| Scrambling identity field in DCI format 2B | $n_{SCID}$ |
| --- | --- |
| 0 | 0 |
| 1 | 1 |

In case of DCI format 2C, $n_{SCID}$ is given by the following table.

TABLE 8

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 6:
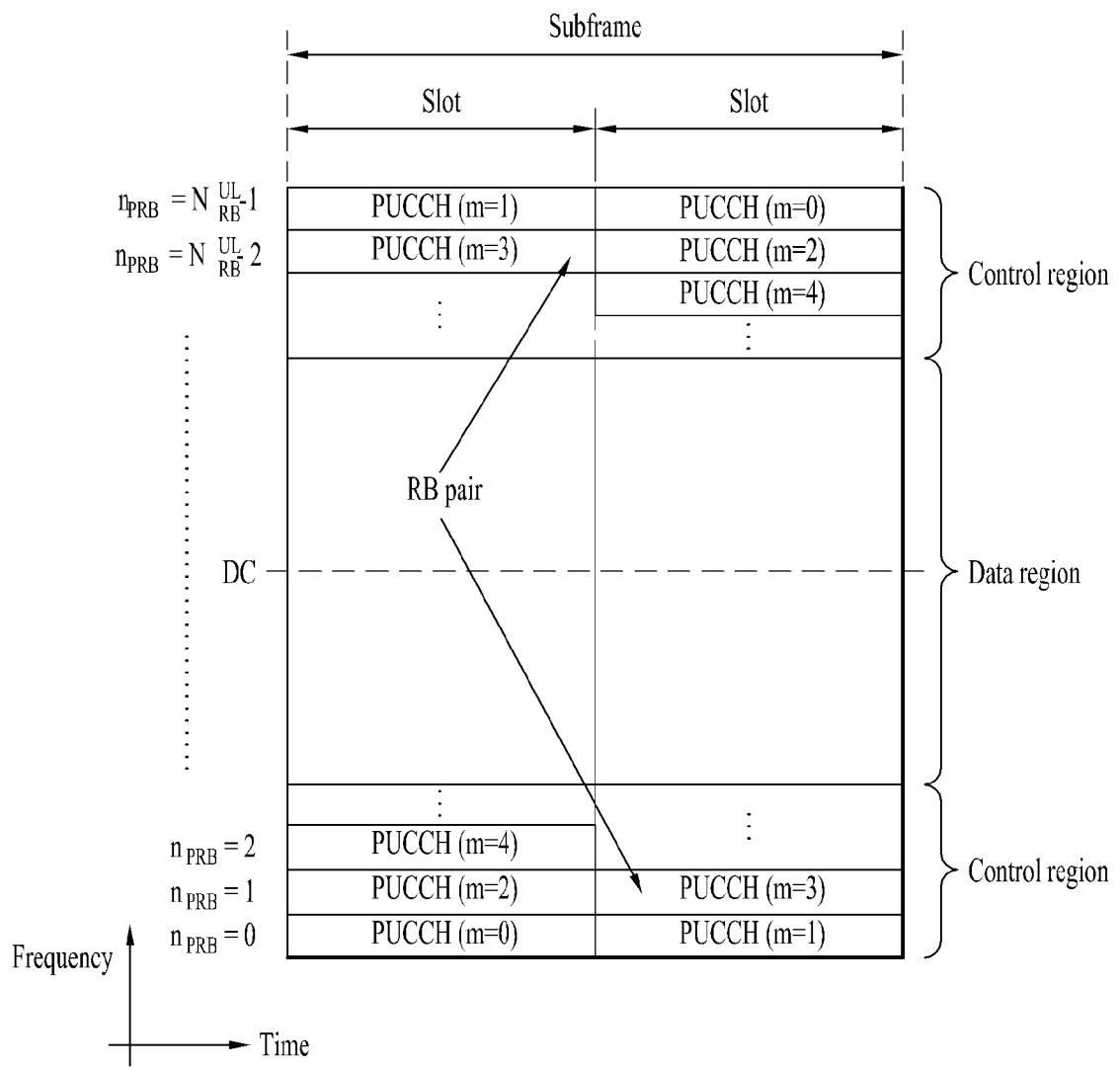
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

FIG. 7 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

Figure 8:
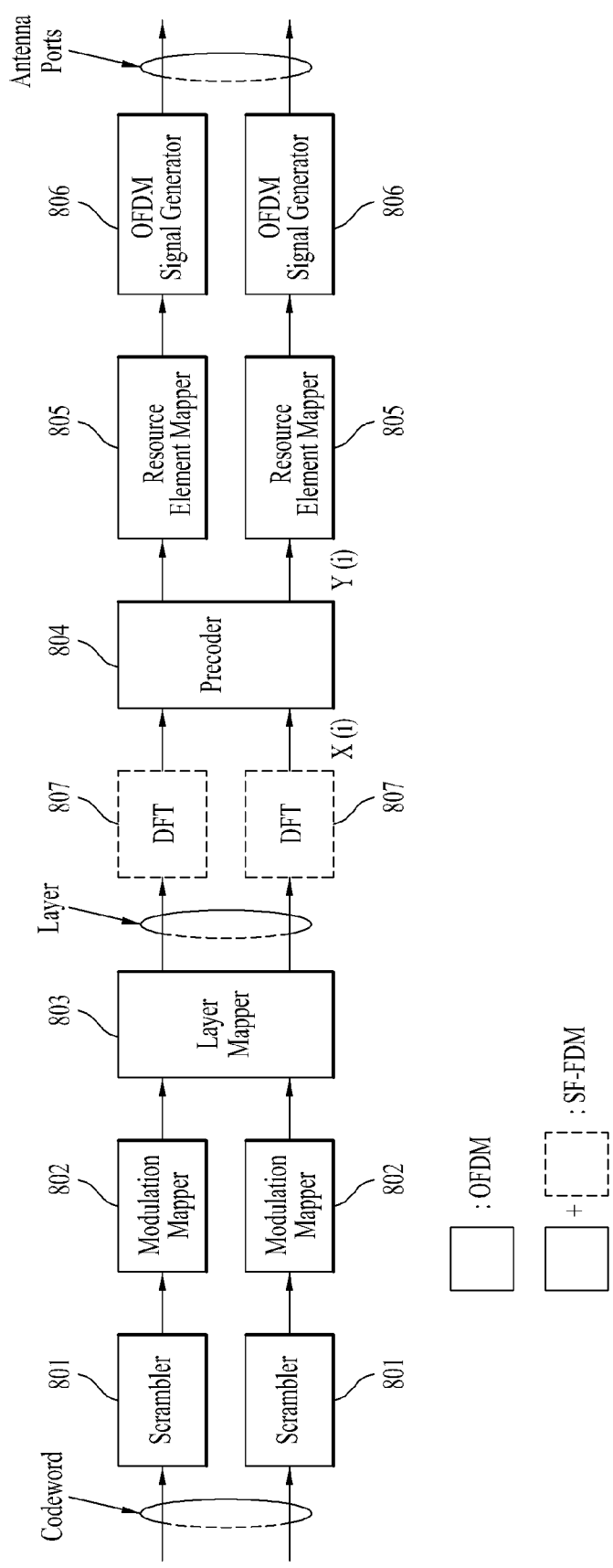
FIG. 8 illustrates an overview of physical channel processing.

FIG. 8 illustrates an overview of physical channel processing. A baseband signal representing a PUSCH or a PDSCH may be defined by a processing procedure of FIG. 8.

Referring to FIG. 8, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 may be configured to include the scramblers 301, the modulation mappers 302, the layer mapper 303, the precoder 304, the RE mappers 305, and the OFDM signal generators 306. Likewise, the processor 21 of the receiving device 20 may be configured to include the signal recoverer, the multiplexer, and the channel demodulator.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When a UE performs initial access to a specific cell, the UE receives the MIB and SIB(s) for the cell and RRC parameters from an eNB operating/controlling the cell. In this case, the MTC UE is likely to need a wider coverage than the legacy UE in terms of usage of the MTC UE. Accordingly, if the eNB transmits the SIB, the RRC parameters and the like to the MTC UE as it does to the legacy UE, the MTC UE may have difficulty in receiving the SIB, the RRC parameters and the like. To allow the MTC UE to effectively receive the system information and RRC information transmitted by the eNB, the present invention proposes techniques which can enhance the coverage of a signal carrying the system information and RRC information compared to the conventional techniques for transmission of the system information and RRC information to the legacy UE. Embodiments described below relate to methods for enhancing the coverage, and therefore can be applied not only to the MTC UEs but also to other UEs having a coverage issue. For simplicity of illustration, a UE that is implemented to use a coverage enhancing method of the present invention will be called an MTC UE, and a UE that is not implemented to use the coverage enhancing method of the present invention will be called a legacy UE in the descriptions given below.

A. Shortening SIB, Cell-Specific RRC and UE-Specific RRC

In order to enhance the coverage of an MIB, an SIB, a cell-specific RRC and UE-specific RRC parameters transmitted to the MTC UE, the present invention proposes that the number of bits of the parameters be reduced. If the number of information bits carried by the MIB, SIB and RRC signals is reduced, transmission coverage may be extended since transmission overhead is reduced, and coding rate is lowered. To reduce the number of transmission information bits, cell-specific higher layer signals of an MIB, an SIB and cell-specific RRC parameters transmitted for MTC UE(s) having a coverage issue and UE-specific RRC parameters may be transmitted using a method different from the conventional transmission method.

The present invention proposes methods for transmitting an MIB, an SIB or RRC parameters to an MTC UE having a coverage issue. To this end, the methods described below may be used. The methods will be described in relation to transmission of the SIB, but they may also be applied to transmission of an MIB, a cell-specific RRC or a UE-specific RRC.

Method A-1) Index Transmission

FIG. 9 illustrates another method for shortening parameters according to one embodiment of the present invention.

The eNB may inform a UE having a coverage issue of SIBs for the UE to use, using the following method. First, SIB sets having different values for the parameters of all or some of the SIBs may be predefined. For example, when there are SIB set 0, SIB set 1, . . . , and SIB set N provided as the SIB sets, the eNB and the UE may pre-share the SIB sets. The SIB sets may be predefined and stored in the eNB and UE, or may be provided to the UE by the eNB when the UE is connected to the eNB.

In the LTE-A system, several SIBs used for different purposes and transmitted through broadcast or dedicated signalling are defined including SystemInformationBlockType1 (SIB1), which contains information relevant when evaluating whether the UE is allowed to access a cell and defines scheduling of the other SIBs, SystemInformationBlockType2 (SIB2), which contains common and shared channel information, and SystemInformationBlockType3 (SIB3), which mainly contains cell reselection information related to a serving cell. The SIB sets of the present invention may be independently configured for the respective SIBs such as SIB1, SIB2 and SIB3 and independently transmitted according to different indexes. Alternatively, integrated SIB sets may be configured for several SIBs such as SIB1, SIB2 and SIB3 and signaled to the UE at the same time. For simplicity of illustration, a set of SIB parameter values will be called an SIB set. The SIB set is not changed according to a combination of SIB types, but changed according to the values set in the parameters for one SIB type. For example, various values may be set in a series of parameters that an MIB, SIBx (x being an integer greater than 0) or specific RRC message contains. If the value of at least one of the parameters changes, the parameter set is also changed to another parameter set. In other words, one SIB set includes a plurality of bits or values, and different SIB sets have different values of the parameters, not the values of different parameters. Accordingly, if the values of the parameters of one SIB set are different from those of another SIB set, the SIB sets are different from each other.

For SIB1, several SIB1 sets may be defined. In this case, each SIB1 set includes values of the parameters belonging to SIB1. The following tables shows parameters constituting one SIB1 set and descriptions thereof

TABLE 7

| Parameter 0 | Parameter 1 | Parameter 2 | Parameter 3 | Parameter 4 |
| --- | --- | --- | --- | --- |
| Public Land Mobile Network (PLMN) identities of the network | The tracking area code (TAC) and cell ID | The cell barring status | q-RxLevMin | The transmissions times and periodicities of other SIBs |

The following table provides descriptions of the parameters shown in Table 7.

TABLE 8

SystemInformationBlockType1 field descriptions

PLMN identities of the network

List of PLMN identities. The first listed PLMN-Identity is the primary PLMN.
TAC A trackingAreaCode that is common for all the PLMNs listed.
cell ID Cell identifier that is used to unambiguously identify a cell within a PLMN.
Cell barring status indicates if the cell is barred, as defined in 3GPP TS 36.304.
q-RxLevMin Parameter for the minimum required reception level in the cell.
transmission times of SIB the number of transmissions for an Si-message to which other SIB(s) mapped.
periodicity of SIB Periodicity of the Si-message in radio frames, such that rf8 denotes 8 radio frames, rf16 denotes 16 radio frames, and so on.

For example, one SIB1 may include parameter values shown in Table 7. SIB1 sets may be defined according to the value of each of the five parameters in Table 7. For example, if the value of at least one of the five parameters in Table 7 changes, a different SIB1 set is defined. When it is assumed that there are 6 SIB1 sets, the parameter values for the SIB1 sets may be pre-shared by the eNB and the UE. The 6 SIB1 sets are defined to have different values for at least one of the parameters configuring the SIB1 sets. The eNB may inform the UE of a specific SIB1 set for the UE to use by transmitting to the UE one of the index values of the 6 SIB1 sets. In other words, a plurality of SIB1s may be defined according to the values set in the parameters that the SIB1s contain and pre-shared by the eNB and the UE. The eNB may inform the UE of the parameter values for the UE to use by dynamically, semi-statically or statically transmitting to the UE one of predefined sets of the SIB1 parameter values.

As shown in FIG. 9(a) or 9(b), the eNB may inform the UE of SIB parameters for the UE to use by transmitting to the UE an index of an SIB set. For example, the eNB may transmit to the UE one of index values of the SIB1 sets as defined in the following table.

TABLE 9

| Value | Indicated SIB1 |
| --- | --- |
| 0 | SIB1 set 0 |
| 1 | SIB1 set 1 |
| 2 | SIB1 set 2 |
| 3 | SIB1 set 3 |
| 4 | SIB1 set 4 |
| 5 | SIB1 set 5 |

As shown in FIG. 9(a), SIB parameters for the UE to use may be expressed using one SIB set index. Alternatively, an SIB set may be configured by a set of multiple SIB sets. For example, as shown in FIG. 9(b), SIB parameters for the UE to use may be divided into two or more parts and expressed with two or more SIB set indexes. Referring to FIG. 9(b), sets of different SIB sets configured by N SIB sets and K SIB sets respectively indicate values for different parameters. In this case, a set of one SIB set may include parameters for one SIB type or may include parameters belonging to multiple SIB types.

Similarly, predefined RRC parameter sets may be configured for the RRC parameters, and the eNB may inform the UE of cell-specific RRC parameters for the UE to use by transmitting only the index of an RRC parameter set to the UE. In this case, RRC parameter sets may be divided into sets for cell-specific RRC parameters, and sets for UE-specific RRC parameters. That is, the UE may distinguish between an index of a cell-specific RRC parameter and an index of a UE-specific RRC parameter which the UE receives, and recognize information on the cell-specific RRC parameter and the UE-specific RRC parameter for the UE to use through the indexes.

Method A-2) Index Transmission+Additional Transmission

Figure 10:
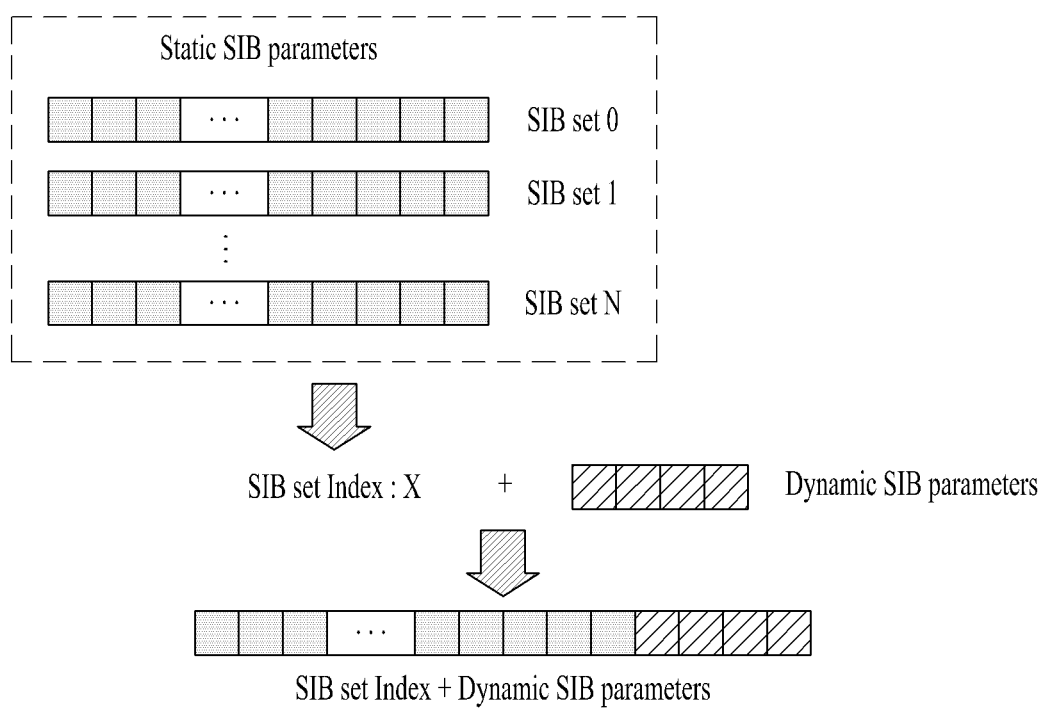
FIG. 10 illustrates another method for shortening parameters according to one embodiment of the present invention.

FIG. 10 illustrates another method for shortening parameters according to one embodiment of the present invention.

In order for the eNB to transmit SIBs to an MTC UE having a coverage issue, the eNB may inform the UE of information on the SIBs for the UE to use by transmitting index values of SIB sets for each of SIB1, SIB2, SIB3, . . . as mentioned in Method A-1 or by transmitting an index value for integrated SIB sets for all SIBs.

In Method A-2, which is a variant of Method A-1, a method of the eNB informing the UE of SIBs for the UE to use by transmitting indexes of SIB sets to the UE and a method of directly transmitting the values of the SIB parameters to the UE may be used for the eNB to transmit the SIB parameters to the UE. In this method, SIB parameters are divided into two parts first, which will be called static SIB parameter(s) and dynamic SIB parameter(s) respectively. The static SIB parameter(s) may be configured by SIB parameters different from the SIB parameters configuring the dynamic SIB parameter(s). The static SIB parameter(s) constructed by a portion of the SIB parameters may be configured by multiple sets as shown FIG. 10, and the information on each set may be pre-shared by the eNB and the UE. In this case, the eNB may inform the UE of information on the static SIB parameters among the entire static SIB parameters by informing the UE of the index of a static SIB parameter set for the UE to use. In addition, in order to inform the UE of the dynamic SIB parameters of the SIB parameters, the eNB may directly inform the UE of a value of the dynamic SIB parameter part of an SIB. The UE may recognize the information on the entirety of SIBs using the received SIB set index and the values of the dynamic SIB parameters.

One set of static SIB parameters may be configured. If only one static SIB parameter set is configured, the UE may receive only the values of the dynamic SIB parameters from the eNB without receiving the SIB set index. The UE may obtain the entire SIB information using the static SIB parameter(s) that the UE is aware of and the dynamic SIB parameter value(s) received from the eNB.

Method A-3) Index Transmission+Partial Retransmission

Figure 11:
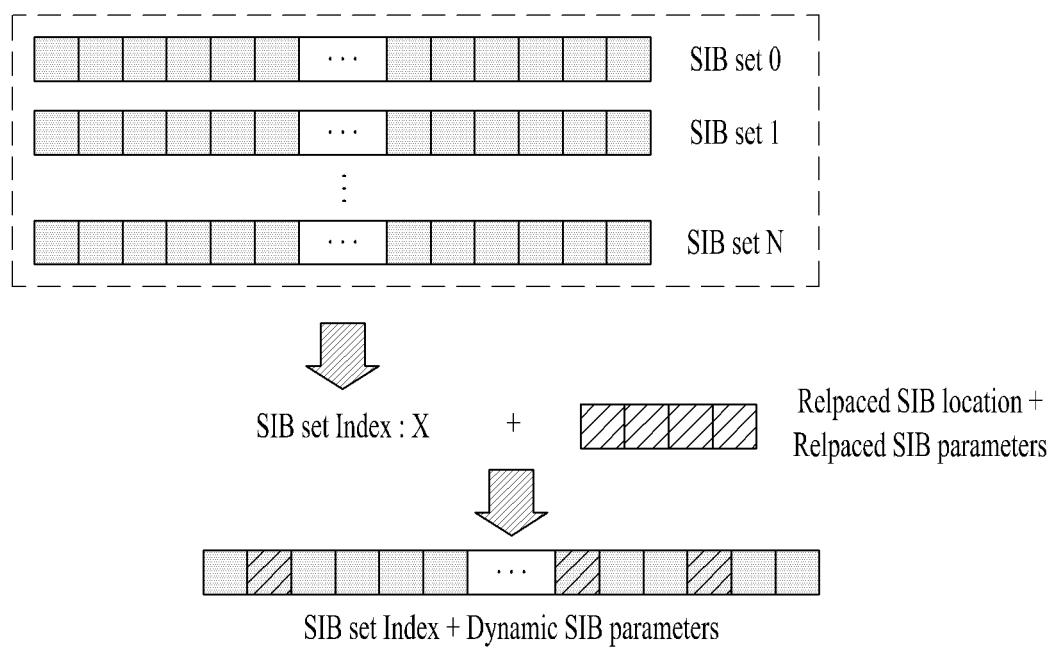

FIGS. 11 and 12 illustrate a method for shortening parameters according to one embodiment of the present invention.

As another method for the eNB to transmit SIBs to an MTC UE having a coverage issue, the present invention proposes that the index transmission and a method for directly transmitting SIB parameters be used. Similar to Method A-2, the indexes and SIB parameter value(s) are directly transmitted in Method A-3. However, the SIB parameter value(s) are transmitted using a method different from Method A-2. In this method, multiple SIB sets having different parameter values for a specific SIB may be configured as in Method A-1, and the eNB and the UE may pre-share the information on the SIB sets. In this case, as shown in FIG. 11, the eNB may inform the UE of SIB parameter value(s) for the UE to use by informing the UE of the index of an SIB set. The eNB may additionally inform the UE of the value(s) of the SIB parameter and the position of the SIB parameter represented by the value(s) such that the values of some parameters of the SIB parameters indicated by an SIB set index are changed and used. That is, the UE receives, from the eNB, information on the "SIB set index value", "the location of a parameter whose value is to be replaced" and "the value of the replaced SIB parameter(s)". Once the UE receives this information, the UE may replace the values of some parameter(s) corresponding to "the location of a parameter whose value is to be replaced" among the parameters of an SIB set indicated by the index with "the value of the replaced SIB parameter(s)", as shown in FIG. 11.

The UE may be notified of "the location of a parameter whose value is to be replaced" and "the value of the replaced SIB parameter(s)" using, for example, a format as shown in FIG. 12. For example, referring to FIG. 12, the UE may be notified of "the location of a parameter whose value is to be replaced" using a bitmap technique, and subsequently notified of "the value of the replaced SIB parameter(s)". For example, when the total number of parameters is 10, the value of each of the 10 parameters may be delivered to the UE through an SIB set index, the location and value of a parameter which is to be changed among the 10 parameter values corresponding to the SIB set index may be delivered to the UE. Among the 10 parameter values, the location of a parameter to be replaced may be delivered using a bitmap constructed by 10 bits. If parameter 1 and parameter 5 are parameters to be changed as shown in FIG. 12, the eNB may transmit, to the UE, a bitmap having bits for parameter 1 and parameter 5 set to 1 and the other bits set to 0, a (new) value for parameter 1 and a (new) value for parameter 5.

Only one SIB set may be shared by the eNB and the UE. In this case, the UE may receive, from the eNB, only information on "the location of a parameter whose value is to be replaced" and "the value of the replaced SIB parameter(s)" without a need to receive an SIB set index. The UE may obtain the entire SIB information using the SIB parameter(s) that the UE is aware of, and "the location of a parameter whose value is to be replaced" and "the value of the replaced SIB parameter(s)" received from the eNB.

For reference, in the case of RRC, it may be assumed that a default value for all RRC parameters is set. Accordingly, if the UE does not receive the RRC parameters, the UE is assumed to be capable of operating using the default parameter value. When it is assumed that all the RRC parameters are given indexes, the eNB may change the individual RRC parameter in the form of <index, new_value> in replacing the default value with another value.

As described above, the MIB parameter, the SIB parameter and the RRC parameter are distinguishably used. However, since the parameter(s) that an MIB and the parameter(s) that an SIB contains are information configured by an RRC layer, which is a higher layer, they may be collectively referred to as higher layer parameter(s) or RRC layer parameter(s).

B. Transmission of SIB, Cell-Specific RRC and UE-Specific RRC

Embodiment A of the present invention described above may be viewed as relating to methods for configuring contents of a higher layer signal. A higher layer signal configured according to at least one of the methods of Embodiment A may be transmitted over a physical layer channel using one or at least one of the methods according to Embodiment B of the present invention. Alternatively, the methods according to Embodiment B, described below, may be independently implemented without implementing Embodiment A. For example, MIB, SIB and RRC messages configured according to the existing definitions may be transmitted to the UE according to at least one of the methods of Embodiment B.

Transmission Over PBCH

If the eNB transmits cell-specific higher layer signals of SIB parameters and RRC parameters to MTC UEs using the same method as used for transmission to legacy UEs, an MTC UE having a coverage issue may have difficulty in receiving the signals. To address this difficulty, the eNB may transmit, to the MTC UE, some or all of the SIB or cell-specific RRC parameters for the MTC UE over a separate PBCH for the MTC UE. In other words, the eNB may transmit, to MTC UEs, cell-specific higher layer signals for SIB parameters and cell-specific RRC parameters and the like for the MTC UEs over a PBCH separately designated for the MTC UEs, not over the PBCH (hereinafter, legacy PBCH) used by the legacy UE. Hereinafter, the PBCH used only for the MTC UE(s) will be referred to as an MTC-PBCH.

The MTC-PBCH may carry some or all of the SIB parameters and/or cell-specific RRC parameters in addition to the system information carried by the legacy PBCH. A higher layer signal transmitted over the MTC-PBCH, namely, a cell-specific higher layer signal of the SIB parameters and cell-specific RRC parameters for the MTC UE(s) may be configured according to one of Method A-1, Method A-2 and Method A-3 of Embodiment A.

Meanwhile, the MTC-PBCH may carry parameters related to PRACH transmission in addition to the system information (see Table 4) carried by the legacy PBCH. The parameters related to PRACH transmission include 1) random access channel parameters (PRACH configuration and frequency position) and 2) parameters for determining root sequences cyclic shifts of the root sequences in preamble sequence sets for the Pcell (logic root sequence indexes, cyclic shifts ($N_{CS}$) and a set type (an unrestricted set or a restricted set)). For details of the PRACH transmission-related parameters, see 3GPP TS 36.211.

The PRACH transmission-related parameters may be independently transmitted over the MTC-PBCH, or may be included in the aforementioned SIB sets and transmitted over the MTC-PBCH.

Cell-specific higher layer signals of the SIB or cell-specific RRC parameters for the MTC UE(s) having a coverage issue may be transmitted in a PDSCH region separate from the region of a PDSCH over which cell-specific higher layer signals for the legacy UEs are transmitted. In this case, the eNB may include, on the MTC-PBCH, position information (e.g., subframe position and RB position) on the resources for carrying the cell-specific higher layer signal(s) of the SIB or cell-specific RRC parameters for an MTC UE having a coverage issue.

The shortened SIB and RRC parameters proposed in Embodiment A may be used for MTC UEs whose coverage needs to be enhanced. For example, when it is assumed that data for supporting the MTC UE(s) whose coverage needs to be enhanced can be transmitted only in multimedia broadcast multicast service single frequency network (MBSFN) subframes, the master information block (MIB) may include, for example, the following parameters.

TABLE 10

| MasterInformationBlock ::= | SEQUENCE { |
|---|---|
| systemFrameNumber | BIT STRING (SIZE (8)), |
| mbsfn-SubframeConfigList | MBSFN-SubframeConfigList |
| } | |

In Table 10, "mbsfn-SubframeConfigList" defines the reserved subframes for the MBSFN on downlink. For reference, the MBSFN is a technology for transmitting data at the same time by synchronizing radio resources on all nodes belonging to an MBSFN area. The MBSFN area refers to an area covered by one MBSFN. According to the MBSFN, when the UE is positioned on the boundary of the coverage of a node which the UE accesses, the signal from a neighbor node serves as a gain for the UE, not as interference. That is, the MBSFN adopts a single frequency network (SFN) function for MBMS transmission to attenuate service interference caused by frequency switching during MBMS transmission. Accordingly, in the MBSFN area, the UE recognizes MBMS data transmitted from multiple nodes as being transmitted from one node. In the area, the UE is seamlessly provided with a broadcast service without a separate handover procedure even if it moves. In addition, as a plurality of nodes uses a single frequency in the MBSFN to perform synchronized transmission. Thereby, frequency resources may be saved, and spectrum utilization may be enhanced. Each MBSFN subframe is divided into a non-MBSFN region and an MBSFN region in the time domain. The non-MBSFN region spans one or two leading OFDM symbols in the MBSFN subframe, and the MBSFN region is defined as the OFDM symbols not used for the non-MBSFN region in the MBSFN subframe. The number of OFDM symbols constructing the non-MBSFN region is defined depending on whether a corresponding carrier supports the PDSCH, the number of cell-specific antenna ports, and/or whether or not the given subframes correspond to subframes 1 and 6 of frame structure type 2.

Referring to Table 10, the MIB may contain information on a necessary SFN and MBSFN. Information on the subframes for the MBSFN may not indicate a set of subframes (e.g., whether each of the subframes other than the subframes which cannot be used for the MBSFN due to specific usage thereof among the 40 consecutive subframes in FDD are reserved using the bits corresponding to the subframes one by one). Instead, the index of one of multiple MBSFN configuration sets may be set in an MBSFN parameter on the assumption that the MBSFN configuration sets are pre-shared by the eNB and the UE according to Embodiment A. In this case, Table 10 may be changed to the following table.

TABLE 11

| MasterInformationBlock ::= | SEQUENCE { |
|---|---|
| systemFrameNumber | BIT STRING (SIZE (8)), |
| mbsfc-SubframeConfigIndex | BIT STRING (SIZE (4)) |
| } | |

Referring to Table 11, multiple MBSFN subframe configurations may be pre-shared by the eNB and the UE, and an MBSFN subframe configuration that the UE needs to consider in configuring a system of the UE for the MBSFN may be indicated by "mbsfn-SubframeConfigIndex" configured to indicate one of the multiple MBSFN subframe configurations.

Referring to FIGS. 1 and 3, the legacy PBCH is configured to be transmitted in the first subframe (i.e., subframe 0)

of the subframes 0 to 9 in every radio frame, and therefore the MTC-PBCH for enhancing the coverage may be configured to be transmitted in the sixth subframe (i.e., subframe 5) of every radio frame or in the first and sixth subframes of every radio frame in order to reduce impact on the legacy UE. When the MTC-PBCH is configured in the first subframe of every radio frame, the MTC-PBCH may be configured avoiding the legacy PBCH region (namely, OFDM symbols 0 to 3 in the second slot of the first subframe). In addition, the MTC-PBCH may be configured so as to avoid collision with the CRS. For the normal CP, the MTC-PBCH may be configured, for example, on OFDM symbols 2 and 3 in the first slot of the first subframe of a radio frame and OFDM symbols 5 and 6 in the second slot of the first subframe, or may be configured on OFDM symbols 2 to 4 in the first slot. For the extended CP, the MTC-PBCH may be configured, for example, on OFDM symbols 1 to 3 in the first slot of the first subframe of a radio frame.

In order for an MTC UE to determine that the MTC UE is a UE whose coverage needs to be enhanced, the MTC UE may utilize information such as the time needed to receive PSSs/SSSs, the number of subframes and/or the number of PSSs/SSSs. If the MTC UE determines that the MTC UE is a UE whose coverage needs to be enhanced using such information, it may receive higher layer signal(s) over the MTC-PBCH, not the legacy PBCH. Alternatively, if the MTC UE does not know that the MTC UE is a UE whose coverage needs to be enhanced, it may attempt to receive both the legacy PBCH and the MTC-PBCH. For example, if the MTC UE fails to receive a PBCH through the legacy PBCH region, it may attempt to receive the PBCH through the MTC-PBCH region.

Transmission Over PDSCH

Figure 13:
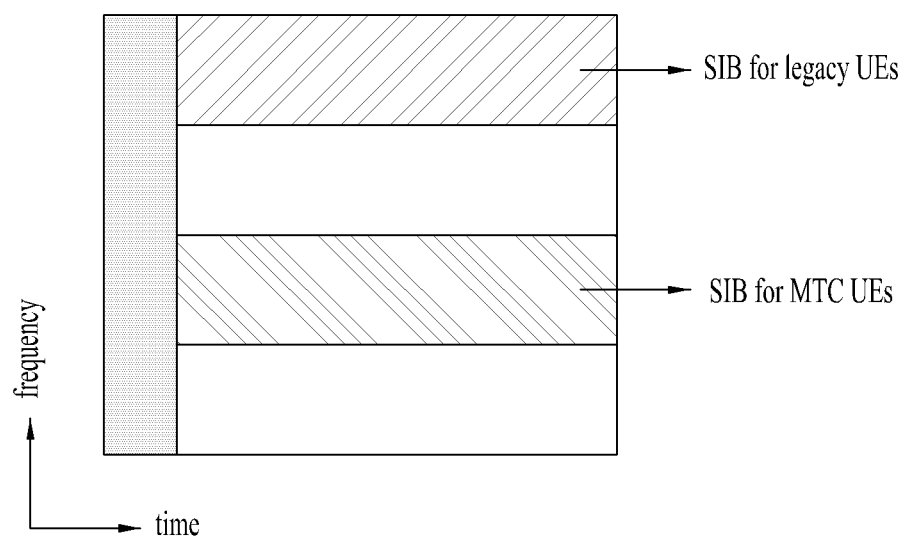
FIGS. 13 and 14 illustrate a higher layer transmission method according to one embodiment of the present invention.
Figure 14:
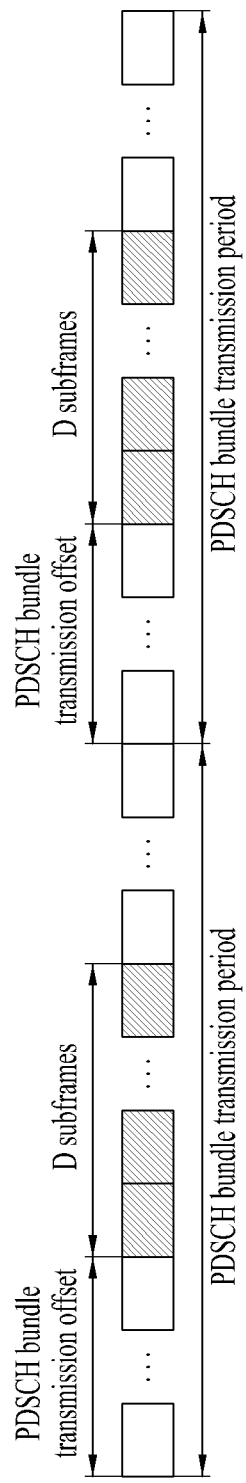

FIGS. 13 and 14 illustrate a higher layer transmission method according to one embodiment of the present invention.

If the eNB transmits, to MTC UE(s), higher layer signal(s) of SIB and RRC parameters using the same method as used for transmission to legacy UEs, an MTC UE having a coverage issue may have difficulty in receiving the signal(s). To address this difficulty, the eNB may transmit higher layer signals of SIB and RRC parameters to the MTC UE(s) having a coverage issue through a PDSCH region separate from the PDSCH region through which the eNB transmits higher layer signal(s) of SIB and RRC parameters to the legacy UE(s). For example, as shown in FIG. 13, a PDSCH for carrying SIBs for all MTC UEs or MTC UE(s) having a coverage issue may be configured separately from the PDSCH for carrying SIBs for the legacy UE(s). An MTC UE may receive SIB information by receiving the PDSCH for carrying SIBs only for the MTC UE(s). RB(s) to which the PDSCH for the MTC UE is mapped maybe predefined or signalled to the MTC UE over a PDCCH.

The SIB parameters or RRC parameters for the MTC UE(s) which are transmitted over the PDSCH configured separately from the PDSCH for the legacy UE may be shortened and transmitted using a method different from the existing method for directly transmitting the SIB parameters or RRC parameters. For example, the amount of SIB and/or cell-specific RRC information shortened according to Embodiment A may be transmitted over a PDSCH separate from the PDSCH for carrying a higher layer signal for the legacy UE.

In addition, techniques for enhancing coverage, such as subframe repetition, subframe bundling, and increase of RS density, may be applied to the PDSCH for carrying higher layer signal(s) of SIB and RRC parameters only for the MTC UE(s) having a coverage issue.

For example, when there is a coverage issue, the eNB may repetitively transmit the PDSCH over multiple subframes to enhance the coverage of the PDSCH, thereby causing the UE to combine or connect the (weak) PDSCH signals repetitively received over the multiple subframes and decode the same. In other words, the PDSCH for the UE(s) having the coverage issue may be transmitted in each of multiple subframes, thereby being repetitively transmitted over the multiple subframes. The UE may successfully receive the PDSCH using the PDSCH signals received over a subframe bundle, which is a set of multiple subframes, together. The subframes over which the eNB repetitively transmits the PDSCH for the UE(s) having the coverage issue may be reserved by PDSCH bundle transmission period, PDSCH bundle transmission offset, and PDSCH bundle size "D", as shown in FIG. 14.

Referring to FIG. 14, the PDSCH bundle transmission period may represent a period during which PDSCH bundle transmission is applied, namely a period during which bundled subframes are configured for PDSCH transmission. The bundled subframes refer to a bundle of multiple subframes which are used for transmission of the same signal/data. The bundled subframes for bundle transmission may be applied only once, or may be applied repetitively every predetermined number of frames/subframes. Accordingly, subframe may be bundled only once for PDSCH bundle transmission, or the PDSCH may be bundle-transmitted in the subframes for PDSCH bundle transmission in every PDSCH bundle transmission period.

The PDSCH bundle transmission offset may represent the position at which the bundled subframes start for PDSCH transmission. For example, the PDSCH bundle transmission offset may be information indicating the position of the subframe from which PDSCH bundle transmission starts among the subframes in a predetermined number of radio frames or the subframes belonging to the PDSCH bundle period. The PDSCH bundle size "D" may correspond to the number of subframes bundled among the subframes belonging to one PDSCH bundle transmission period. When it is assumed that consecutive DL subframes are bundled, the subframes for PDSCH bundle transmission may be indicated by the PDSCH bundle transmission offset and the PDSCH bundle size. Subframes for PDSCH repetitive transmission may be reserved using a bitmap constructed by bits that correspond one by one to the subframes matching a certain duration or PDSCH bundle period, in place of the PDSCH bundle transmission offset and PDSCH bundle size.

The subframes for PDSCH bundle transmission may be pre-configured and may be activated or deactivated by a higher layer signal or a physical layer signal. When the subframes for PDSCH bundle transmission are activated, the UE/eNB of the present invention may receive/transmit the PDSCH in each of the subframes.

As described above, RB(s) used for PDSCH transmission in the bundled subframes for PDSCH bundle transmission may be predefined or configured through a higher layer signal such as an RRC signal. An MTC UE may receive PDSCH signals on the RB(s) mapped to the PDSCH for the MTC UE in each of the subframes for PDSCH transmission, based on the subframe configuration information including a PDSCH bundle transmission period, a PDSCH bundle transmission offset and/or a PDSCH bundle size, and decode the PDSCH using some or all of the PDSCH signals, thereby acquiring the higher layer signal according to the present invention.

The eNB needs to distinguish an MTC UE with a coverage issue from an MTC UE without a coverage issue in order to transmit to an MTC UE data and signals corresponding to the channel condition. In addition, an MTC UE needs to know whether or not the MTC UE is a UE with a coverage issue. The eNB does not recognize presence of the UE until the UE transmits the PRACH. Since the eNB does not recognize the presence of the UE until the UE receives an SIB for the first time, it is better for the MTC UE to determine whether the MTC UE has the coverage issue. If the MTC UE determines that the MTC UE has a coverage issue, the MTC UE may transmit a PRACH by applying a technique of enhancing the coverage to inform the eNB that the MTC UE has a coverage issue. The eNB does not know whether a UE has a coverage issue until the UE with a coverage issue informs the eNB of the coverage issue through, for example, PRACH transmission subject to coverage enhancement or the UE completes initial access to the eNB. Accordingly, it is better for the eNB transmit an SIB for MTC UEs needing coverage enhancement to the MTC UE (even if the eNB has not recognized the MTC UE with the coverage issue). If the UE has transmitted the PRACH and completed initial access to the eNB, the eNB may determine whether the UE has the coverage issue and a coverage enhancement level, and the like (through, for example, RRM information) and inform the UE of the determination. To allow the MTC UE to know whether or not the MTC UE is a UE having the coverage issue, the physical layer of the MTC UE needs to signal at least one of the following information to a higher layer.

Time needed to successfully receive a PSS/SSS, the number of subframes and/or the number of PSSs/SSSs Time needed to successfully receive a PBCH, the number of subframes, and the number of PBCHs A result obtained by performing radio resource management (e.g., reference signal received power (RSRP))

Time needed to successfully receive an SIB in the same manner as for the legacy UE and/or the number of subframes, or information indicating whether or not SIB reception attempted for a specific time duration is successful The higher layer (of the UE) may determine whether or not the UE has the coverage issue, using the information described above. After performing determination, the higher layer may inform the physical layer (thereof) of the following information.

An indicator indicating that the UE has the coverage issue: If the value of the indicator is 0, this may indicate that the UE does not have a coverage issue. If the value of the indicator is 1, this may indicate that the UE has a coverage issue.

An indicator indicating whether the UE is to use an SI-RNTI or an MTC-SI-RNTI: If the value of the indicator is 0, the UE uses the existing SI-RNTI (system information RNTI) to receive system information. If the value of the indicator is 1, the UE uses the MTC-SI-RNTI to receive system information. Herein, the MTC-SI-RNTI may be predefined as a specific value. Alternatively, the eNB may inform the UE of the MTC-SI-RNTI by including the MTC-SI-RNTI in the MIB.

A value of an MTC-SI-RNTI for the UE to use in place of the SI-RNTI: e.g.) If the UE has a coverage issue, the eNB may inform the UE of the value of the MTC-SI-RNTI that is to be used in place of the SI-RNTI.

Thereby, the UE may determine whether or not the UE has the coverage issue and may additionally recognize whether or not the UE should use the MTC-SI-RNTI for reception of an SIB and the like.

The RRM is intended to provide the UE with a mobility experience to cause the UE and the network to seamlessly manage the mobility without great user intervention, to ensure efficient use of available radio resources, and to provide a mechanism allowing the eNB to satisfy predefined radio resource-related requirements. Main procedures performed by the UE to support seamless mobility include cell search, measurements, handover and cell reselection. The eNB may provide a measurement configuration applicable to the UE for RRM. For example, the eNB may transmit to the UE a measurement configuration for RRM including a measurement object, a reporting configuration, a measurement identity, a quantity configuration, and a measurement gap to trigger measurement by the UE. The measurement object refers to an object on which the UE needs to perform measurement. Examples of the measurement object may include a single E-UTRA carrier frequency for intra-frequency and inter-frequency measurements, a single UTRA frequency for inter-RAT (Radio Access Technology) UTRA measurement, a set of GERAN carrier frequencies for inter-RAT GERAN measurement, and a set of cell(s) on a single carrier frequency for inter-RAT CDMA2000 measurement. The intra-frequency measurement refers to a measurement on DL carrier frequency(s) of serving cell(s), and the inter-frequency measurement refers to a measurement on any one of the DL carrier frequency(s) of the serving cell(s) and other frequency(s). The reporting configuration represents a list of reporting configurations. Each reporting configuration is configured by a reporting criterion representing a criterion that triggers the UE to send a measurement report and a reporting format representing quantities which the UE should include in the measurement report and relevant information. The measurement identity represents a list of measurement identities. Each measurement identity links one measurement object to one reporting configuration. By configuring a plurality of measurement identities, one or more reporting configurations may be linked to one measurement object, and one or more measurement objects may be linked to one reporting configuration. The measurement identities are used as reference numbers in the measurement reporting. The quantity configuration defines measurement quantities and relevant filtering which are used for relevant reporting of all event evaluations and a corresponding measurement type. One filter may be configured for each measurement. The measurement gap represents a period which the UE is allowed to use to perform measurement as no UL/DL transmission is scheduled. Once the UE receives the measurement configuration, the UE performs reference signal received power (RSRP) measurement and reference signal received quality (RSRQ) measurement using a CRS on a carrier frequency indicated as the measurement object. The RSRP measurement provides cell-specific signal strength metric. The RSRP measurement is mainly used to determine the order of candidate cells (or candidate CCs) according to the signal strengths or used as an input for handover and cell reselection determination. The RSRP is a linear average of power contribution of Res carrying the CRS within a considered frequency bandwidth. The RSRP is defined with respect to a specific cell (or a specific CC). The RSRQ is intended to provide cell-specific signal quality metric. Similar to the RSRP, the RSRQ is mainly used to determine the order of candidate cells (or candidate CCs) according to signal qualities. The RSRQ may be used as an input for handover and cell reselection when, for example, the RSRP measurement does not provide sufficient information for performing mobility determination. The RSRQ is defined as "N*RSRP/RSSI", where N denotes the number of RBs of an RSSI measurement bandwidth. A received signal strength indicator (RSSI) is defined as all kinds of powers including total received wideband power observed by the UE from all resources including co-channel serving and non-serving cells within the measurement bandwidth, adjacent channel interference, and thermal noise. Accordingly, the RSRQ may be viewed as representing a ratio of RS power to total power received by the UE.

When cell-specific higher layer signals through which multiple MTC UEs need to simultaneously receive information such as SIBs and cell-specific RRC parameters for the MTC UEs are transmitted, the MTC UEs need to be informed of a PDSCH region (e.g., RB(s) allocated to the PDSCH) in which the higher layer signals are transmitted. To this end, the UE may recognize, through a PDCCH, the PDSCH region in which the cell-specific higher layer signals for the UE are transmitted. In this case, an MTC-SI-RNTI which is an RNTI for MTC UEs having the coverage issue may be predefined separately, and the eNB may transmit the PDCCH using the MTC-SI-RNTI, thereby informing the UE of the PDSCH region in which cell-specific system information or cell-specific higher layer signals for the MTC UEs are transmitted. For example, the eNB may mask the PDCCH with the MTC-SI-RNTI or add a scrambled CRC with the MTC-SI-RNTI and then transmit the PDCCH, thereby informing a UE set in a coverage enhancement mode of the PDCCH for carrying a higher layer signal according to the present invention. Table 12 shows RNTIs which are currently used, and Table 13 shows usage of the RNTIs.

TABLE 12

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

TABLE 13

| RNTI | Usage | Transport Channel | Logical Channel |
| --- | --- | --- | --- |
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |

TABLE 13-continued

| RNTI | Usage | Transport Channel | Logical Channel |
| --- | --- | --- | --- |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

RA-RNTI indicates a value determined based on a PRACH over which a random access preamble has been transmitted. In Table 12, values corresponding to the RA-RNTI values of the PRACH configuration of a cell are not used for another RNTI (C-RNTI and SPS (Semi-Persistent Scheduling)C-RNTI, temporary C-RNTI, TPC-PUCCH-RNTI or TPC-PUSCH-RNTI) in the cell. In Table 13, BCCH, PCCH, CCCH, DCCH, MCCH DTCH and MTCH, which are logical channels provided by the MAC layer, represent a broadcast control channel, a paging control channel, a common control channel, a dedicated control channel, a multicast control channel, a dedicated traffic channel and a multicast traffic channel, respectively.

Referring to Table 12, one value of FFF4 to FFFC, which are reserved for future use, may be used as an RNTI (i.e., an MTC-SI-RNTI) for transmitting an SIB or a cell-specific higher layer signal for an MTC UE having the coverage issue. In receiving system information, the MTC UE may receive a PDCCH using the MTC-SI-RNTI, and receive system information through a PDSCH region indicated by the PDCCH.

Alternatively, to inform the MTC UE having the coverage issue of a position of a resource (e.g. a subframe position and an RB position) on which cell-specific higher layer signals of an SIB or cell-specific RRC parameters for the MTC UE are transmitted, the eNB may transmit corresponding information with the information included in an MTC-PBCH.

Alternatively, a PDSCH region in which cell-specific higher layer signals of SIBs and cell-specific RRC parameters and the like for the MTC UE(s) are transmitted may be fixed or configured to be always transmitted on specific RBs of all subframes or a specific subframe. In this case, the MTC UE having the coverage issue may read the SIB without receiving the PDCCH. Specifically, the subframes in which the PDSCH for carrying the SIBs for the MTC UEs can be transmitted may be arranged at the following positions.

Subframe 5 and subframe 25 (which may correspond to transmission of (SIB1) of subframes 0 to 39 in a 40 ms duration Subframes whose subframe numbers correspond to multiples of 5

For example, SIB1 may include the following parameters (or fields).

TABLE 14

SystemInformationBlockType1 message

```
SystemInformationBlockType1 ::=    SEQUENCE {
    cellAccessRelatedInfo            SEQUENCE {
        plmn-IdentityList                PLMN-IdentityList,
        trackingAreaCode                 TrackingAreaCode,
        cellIdentity                     CellIdentity,
    },
    freqBandIndicator                FreqBandIndicator,
    tdd-Config                       TDD-Config OPTIONAL,
                                     -- CondTDD
    SIB Window                       BIT STRING (4)
}
```

Table 15 shows descriptions of the parameters of Table 14.

TABLE 15

SystemInformationBlockType1 field descriptions plmn-IdentityList

List of PLMN identities. The first listed PLMN-Identity is the primary PLMN.
trackingAreaCode A trackingAreaCode that is common for all the PLMNs listed.
CellIdentity Cell identifier that is used to unambiguously identify a cell within a PLMN.
freqBandIndicator Indicates the E-UTRA operating band as defined in 3GPP TS 36.101.
tdd-Config used to specify the TDD specific physical channel configuration. See Table 1 and Table 2
SIBWindow Common SI scheduling window for all SIs. Unit in milliseconds, where ms1 denotes 1 millisecond, ms2 denotes 2 milliseconds and so on.

To read the existing SIB1, the UE needs to read the PDCCH first. A UE needing coverage enhancement, namely a UE set to a mode for coverage enhancement may assume that SIB1 is received on a specific frequency resource of a specific subframe since reading the PDCCH causes overhead. To allow an MTC UE having the coverage issue to read the SIB without receiving the PDCCH, the UE may, for example, assume that SIB1 has been transmitted if a DMRS, for example, a UE-RS is scrambled with a specific sequence. For example, in Equation 8, if $n_{SCID}=5$ (or a constant other than 0, 1 and 2) is used as a scrambling identifier, the UE may assume that SIB1 comes thereto. Specific subframes for PDSCH transmission for a UE in the coverage enhancement mode may be designated as the first, second, third and fourth subframes of the MBSFN subframes, and specific RB positions for PDSCH transmission may be designated as, for example, 6 central RBs. The subframe positions and RB positions may be designated over the PBCH. SIBs other than SIB1 may also be located at the designated positions, and SIBWindow may designate the period during which SIBs are received. For example, when transmission of MTC-SIB2, . . . MTC-SIB10 is needed for MTC UEs needing coverage enhancement, the UEs may assume that the transmission period of SIBn is SIBWindow*(n−1) or SIBWindow*n. Alternatively, information on the window of the SIBs may be pre-provided in a table, and the index values of the table may be transmitted. For example, a value of the transmission period of each of SIBs (SIB2, SIB3, . . . ) may be predefined as shown in the following table, the index of a period that is to be used may be transmitted to the UE to inform the UE of the transmission period of each SIB.

TABLE 16

|   | SIB2 | SIB3 | SIB4 |
|---|------|------|------|
| 0 | 100 ms | 200 ms | 400 ms |
| 1 | 200 ms | 400 ms | 800 ms |

When TTI bundling is configured to be used for SIB transmission, an SIB may be transmitted over a few consecutive subframes. When TTI bundling is applied, subframes to which the TTI bundling is applied may configure one bundled subframe set. When TTI bundling is configured, the same data is repetitively transmitted in a predetermined number of consecutive subframes (e.g., 4 subframes). The overlap version of the repetitively transmitted data varies with the number of repetitions. In a TTI bundle, HARQ retransmissions are non-adaptive and triggered without waiting for feedback from previous transmissions. The HARQ feedback of the TTI bundle is received only for the last TTI of the TTI bundle.

If the SIB is updated, the eNB may provide the UE with update information through a paging message, thereby allowing the UE to update the SIBs.

The eNB may use the MTC-SI-RNTI to transmit SIBs or cell-specific RRC signals to an MTC UE having a coverage issue through the PDSCH region. Alternatively, the UE having the coverage issue may use the MTC-SI-RNTI to receive an SIB or a cell-specific RRC signal through a fixed PDSCH region. For example, the MTC-SI-RNTI may be used in the following procedures.

1) Scrambling of bits in a transmission block or code block of a corresponding PDSCH 2) Attachment of a CRC to a transmission block or code block of a corresponding PDSCH 3) Scrambling of a pseudo-random sequence for generation of a UE-RS transmitted through the RB region of a corresponding PDSCH Regarding Procedure 1), referring to FIG. 8, bits in each codeword transmitted on a physical channel in one subframe are scrambled prior to modulation 802. The block of bits $b^{(q)}(0), \ldots, b^{(q)}(M_{bit}^{(q)}-1)$ for codeword q can be scrambled, resulting in a block of scrambled bits $\tilde{b}^{(q)}(0), \ldots, \tilde{b}^{(q)}(M_{bit}^{(q)}-1)$, according to the following equation, where $M^{(q)}_{bit}$ is the number of bits in codeword q.

$$\tilde{b}^{(q)}(i)=(b^{(q)}(i)+c^{(q)}(i)) \bmod 2 \quad \text{[Equation 9]}$$

where the scramble sequence $c^{(q)}(i)$ can be given by Equation 7. The scrambling sequence generator is initialized at the start of each subframe. In a transport block for PDSCH, the initialization value $c_{init}$ is given by the following equation.

$$c_{init}=n_{RNTI} \cdot 2^{14}+q \cdot 2^{13}+\lfloor n_s/2 \rfloor \cdot 2^9+N_{ID}^{cell} \quad \text{[Equation 10]}$$

In the present invention, a UE operating in the coverage enhancement mode may apply the MTC-SI-RNTI to $n_{RNTI}$ in Equation 10.

Regarding Procedure 2), a transmission block to be transmitted through the PDSCH is subjected to transmission block processing, transmission block CRC attachment, code block segmentation and code block CRC attachment, channel coding, and rate matching and code block concatenation before mapping to a PDSCH. Error detection is applied to the transmission block or code block through the CRC. The entire transmission block or entire code block is used in calculating CRC parity bits to be attached thereto. In the present invention, the MTC-SI-RNTI may be used to calculate the CRC parity bits. According to one embodiment of the present invention, the CRC parity bits calculated using the MTC-SI-RNTI may be attached to the transmission block or code block corresponding to the higher layer signal. Suppose that the MTC-SI-RNTI is $a_0, a_1, a_2, a_3, \ldots, a_{A-1}$, and the CRC parity bits are $b_0, b_1, b_2$, Herein, A denotes the length of the MTC-SI-RNTI, and L denotes the number of parity bits. The CRC parity bits are be generated by, for example, one of the following cyclic generator polynomials.

$$g_{CRC24A}(D) = [D^{24}+D^{23}+D^{18}+D^{17}+D^{14}+D^{11}+D^{10}++D^6+D^5+D^4+D^3+D+1] \quad \text{[Equation 11]}$$

$$g_{CRC24B}(D)[D^{24}+D^{23}+D^6+D^5+D+1] \quad \text{[Equation 12]}$$

Herein, $g_{CRC24A}$ represents a cyclic generator polynomial for generating 24 parity bits to be attached to the transmission block as a CRC, and $g_{CRC24B}$ represents a cyclic generator polynomial for generating 24 parity bits to be attached to the code block as a CRC. The encoding is performed in a systematic form, which means that, in Galois Field of 2, GF(2), the polynomial '$a_0 D^{A+23}+a_1 D^{A+22}+ \ldots +a_{A-1}D^{A+24}+p_0D^{23}+p_0D^{22}+ \ldots +p_{22}D^1+p_{23}$' yields a remainder equal to 0 when the polynomial is divided by the corresponding length-24 CRC generator polynomial, $g_{CRC24A}$ or $g_{CRC24B}$.

Alternatively, for the entire transmission block or entire code block to which a CRC is to be attached, the CRC may be calculated using Equations 11 and 12, and the calculated CRC may be attached to the corresponding transmission block or transmission block after being scrambled by the MTC-SI-RNTI. For example, the CRC parity bits $b_0, b_1, b_2, b_3, \ldots, b_{L-1}$ may be scrambled with a corresponding MTC-SI-RNTI $x_{rnti,0}, x_{rnti,1}, x_{rnti,2}, \ldots, x_{rnti,C-1}$ according to the following equation.

$$c_k = (b_k + x_{rnti,k}) \bmod 2 \text{ for } k=0,1,2,\ldots,C-1 \quad \text{[Equation 13]}$$

Herein, $x_{rnti,0}$ denotes the most significant bit of the MTC-SI-RNTI, and C denotes the length of the MTC-SI-RNTI.

Regarding Procedure 3), the MTC-SI-RNTI may be applied to the scrambling identifier $n_{SCID}$ of Equation 8. Since the UE is aware of the MTC-SI-RNTI used as the scrambling identifier used in generating the UE-RS, the UE may recognize the UE-RS sequence transmitted together with the PDSCH, and therefore may acquire the higher layer signal carrying the PDSCH by decoding the PDSCH using the UE-RS sequence.

Similarly, when the eNB transmits UE-specific RRC parameters for the MTC UE(s), information on a UE-specific RRC parameter may be transmitted in the PDSCH region in which UE-specific RRC parameters for the MTC UE(s) are transmitted, using a method different from the method for transmitting the existing RRC parameter. For example, multiple sets having values pre-designated for the UE-specific RRC parameters may be predefined, and the index of a set for the UE to use may be signaled to inform the UE of the UE-specific RRC parameter values for the UE to use. Methods which can be used to reduce the quantity of UE-specific RRC parameters of the MTC UE to be transmitted are described in Embodiment A.

Based on the proposed methods of the present invention, the following operations may be performed in the procedure in which an MTC UE having the coverage issue performs initial access to a specific cell.

Method 1. Reception of PSS/SSS: The MTC UE may determine that the UE is a UE needing coverage enhancement by performing the procedure of receiving a PSS/SSS to access the specific cell as follows.

Determination of PSS/SSS reception time duration: The UE attempts to receive the PSS/SSS for time_S_L, which is a specific time duration. If the UE successfully receives the PSS/SSS, the UE may recognize itself as an MTC UE without the coverage issue. In this case, the UE may further attempt to receive PSS/SSS for a duration of 'time_S_M−time_S_L' or for a duration of time_S_M. If the UE fails to receive the PSS/SSS during time_S_L which is a specific time duration value, but successfully receives the PSS/SSS by attempting to receive the PSS/SSS during time_S_M which is a greater time duration value than time_S_L, the UE may recognize itself as an MTC UE for which coverage enhancement needs to be performed. For reference, if the UE fails to receive the PSS/SSS for time_S_M, the UE fails to detect a cell, and thus cannot recognize presence of the cell.

Method 2. Reception of MIB: The MTC UE may determine that the MTC UE is a UE needing coverage enhancement by performing the procedure of receiving a PBCH to be attached to, namely to access a specific cell according to one of the following alternatives.

Alternative 1. Determination of PBCH reception time duration: The UE attempts to receive a PBCH for time_B_L, which is a specific time duration value. If the UE successfully receives the PBCH, the UE may recognize that the UE is an MTC UE without a coverage issue. If the UE fails to receive the PBCH for time_B_L which is a specific time duration value, but successfully receives the PBCH by attempting to receive the PBCH for time_B_M which is a greater time duration value than time_S_L, the UE may recognize itself as an MTC UE for which coverage enhancement needs to be performed.

Alternative 2. Determination according to whether or not a PBCH for MTC is received: Similar to the legacy UE, the UE may attempt to receive the legacy PBCH, and recognize itself as an MTC UE without a coverage issue if it successfully receives the legacy PBCH. If the UE fails to receive the legacy PBCH, the UE may attempt to receive a PBCH for MTC, namely a PBCH (hereinafter, MTC-PBCH) defined separately from the legacy PBCH. If the UE successfully receives the MTC-PBCH, the UE may recognize itself as an MTC UE needing coverage enhancement.

The PBCH for MTC may be transmitted at, for example, the (subframe and RB) position of the legacy PBCH and an additional subframe position or at a new (subframe and/or RB) position different from the position of the legacy PBCH. If the PBCH for MTC is transmitted at the position of the legacy PBCH and an additional subframe position, the PBCH for MTC may be configured with the same content as that for the legacy PBCH. If the PBCH for MTC is transmitted at a new position different from that of the legacy PBCH, the PBCH for MTC may be configured with content the same as or different from that of the legacy PBCH.

Method 3. Use of RRM: The UE may perform RRM for a corresponding cell. If the RRM result (e.g., RSRP) is below a specific threshold value, the UE may recognize itself as an MTC UE needing coverage enhancement.

Method 4. Reception of SIB: Similar to the legacy UE, the UE may attempt to receive an SIB (e.g., SIB1), and recognize itself as an MTC UE needing coverage enhancement if it fails to receive the SIB during a specific time duration.

If the MTC UE recognizes itself as a UE needing coverage enhancement based on Method 1, Method 2, Method 3 and/or Method 4, the MTC UE may receive an SIB through a procedure different from that for the legacy UE. For example, the eNB may transmit an SIB to a UE needing coverage enhancement using at least one of the following alternatives, and the UE needing coverage enhancement may acquire the SIB using at least one of the following alternatives.

Alternative 1. SIB is not received: The MTC UE needing coverage enhancement may obtain partial information of the SIB through an MIB, and transmit a PRACH without attempting to receive the SIB. In this case, partial SIB information such as PRACH configuration is included in the MIB that the MTC UE receives. The partial SIB information such as the PRACH configuration may be included in a new PBCH for the MTC UE, or contained in a reserved bit of the legacy PBCH.

Alternative 2. Reception of SIB using SIB position information included in MIB: The MTC UE needing coverage enhancement may receive an SIB based on information on the transmission position of the SIB PDSCH, which may be included in the MIB and transmitted to the UE. The information on the transmission position of the SIB PDSCH may include a transmission start subframe position of an SIB PDSCH transmission bundle (e.g., PDSCH transmission bundle offset), an SIB PDSCH transmission bundle period (e.g., PDSCH bundle transmission period), an SIB PDSCH transmission bundle size, and an RB position at which the SIB PDSCH is transmitted. The information on the SIB transmission position may be included in a new PBCH for the MTC UE, or may be contained in a reserved bit of the legacy PBCH.

Alternative 3. The MTC UE needing coverage enhancement may receive an SIB at a specific predefined SIB transmission position (by, for example, a standard document).

Alternative 4. Reception of SIB using MTC-SI-RNTI: The MTC UE needing coverage enhancement may attempt to receive PDCCH using the MTC-SI-RNTI not the SI-RNTI, and may attempt to receive a PDSCH carrying an SIB. The MTC UE may demask or descramble the PDCCH using the MTC-SI-RNTI configured for the MTC UE, and determine an effectively demasked or descrambled PDCCH as a PDCCH of the MTC UE.

Alternative 5. Configuration of SIB content: The content of the SIB transmitted to the UE from the eNB according to Alternative 3 may be configured using one of the methods proposed in Embodiment A.

C. Operation of UE for Delay in Reception of SIB and RRC Signals

In the current LTE/LTE-A system, if a UE fails to receive RRC parameters from the eNB in the RRC_connected mode for a certain time, it switches to the RRC_idle mode. However, in the MTC environment, it may take a longer time for a UE operating in the coverage enhancement mode to receive RRC parameter (successfully) than the legacy UE. In order to prevent an MTC UE receiving SIB and RRC parameters for coverage enhancement for a long time from switching to the RRC_idle mode without completing reception as a duration for reception of the RRC parameters passes, the present invention proposes that the MTC UE needing coverage enhancement be maintained in the RRC_connected mode or not switched to the RRC_idle mode.

Embodiment A, Embodiment B and Embodiment C may be applied separately, or a combination of two or more thereof may be applied.

In the embodiments of the present invention, a UE operates as a transmitting device 10 on UL and as a receiving device 20 on DL. In the embodiments of the present invention, an eNB operates as the receiving device 20 on UL and as the transmitting device 10 on DL. Hereinafter, a processor, an RF unit and a memory included in the UE will be referred to as a UE processor, a UE RF unit, and a UE memory, respectively, and a processor, an RF unit and a memory included in the eNB will be referred to as an eNB processor, an eNB RF unit, and an eNB memory, respectively.

The eNB processor of the present invention may generate indication information indicating a parameter set corresponding to higher layer information that is to be actually transmitted among multiple parameter sets defined for transmission of higher layer signals, according to a method of Embodiment A. The eNB processor may cause the eNB RF unit to transmit the indication information. The eNB processor may control the eNB RF unit to transmit higher layer information for the UE in a specific mode corresponding to coverage enhancement over a new PBCH defined separately from the legacy PBCH for the specific mode according to Embodiment B. Alternatively, the eNB processor may transmit the higher layer information for the UE in the specific mode corresponding to coverage enhancement over a PDSCH allocated to the specific mode. If the higher layer information is system information, the eNB processor may use different SI-RNTIs depending on whether or not the higher layer information is intended for the UE in the specific mode. For example, the eNB processor uses an existing SI-RNTI (hereinafter, a legacy SI-RNTI) for transmission of a higher layer signal which is not intended for the UE of the specific mode even if the higher layer signal is configured according to an existing method other that the methods of Embodiment A or according to Embodiment A. On the other hand, for the higher layer information for the UE of the specific mode, the eNB processor may generate a UE-RS for scrambling, CRC attachment and/or demodulation of the PDSCH carrying the higher layer information using a new SI-RNTI (e.g., an MTC-SI-RNTI) defined for the specific mode distinguishably from the legacy SI-RNTI. The eNB processor may apply the new SI-RNTI to a PDCCH carrying scheduling information on the PDSCH. The eNB processor may further apply subframe repetition, subframe bundling, and RS density increase to PDSCH transmission for the UE of the specific mode. To this end, the eNB processor may control the eNB RF unit to transmit information indicating subframes over which PDSCH transmission is to be repeated and/or information indicating an RS pattern with an increased density.

The UE processor of the present invention may control the UE RF unit to receive indicating information indicating a parameter set for the UE to actually use for transmission/reception of a signal in a corresponding cell among multiple parameter sets defined for transmission of higher layer signals, according to a method of Embodiment A. Parameters contained in MIB, SIBx and RRC messages are usually retransmitted every time the values of the parameters change or new parameter values need to be provided to the UE. On the other hand, according to Embodiment A of the present invention, only simple indication information is transmitted to the UE over a higher layer signal. The UE processor may determine or consider that the values of a parameter set indicated by the indication information as values for a set of parameters that the higher layer signal contains. If the UE is set in a specific mode corresponding to coverage enhancement, the UE processor may control the UE RF unit to receive the higher layer information over a new PBCH defined for the specific mode separately from the legacy PBCH according to Embodiment B. Alternatively, if the UE is set in a specific mode corresponding to coverage enhancement, the UE processor may receive the higher layer information for the UE in the specific mode corresponding to coverage enhancement over a PDSCH allocated to the specific mode according to Embodiment B. If the higher layer information is system information, the UE processor may use different SI-RNTIs depending on whether or not the higher layer information is intended for the UE in the specific mode. For example, the UE processor uses an existing SI-RNTI (hereinafter, a legacy SI-RNTI) for transmission of a higher layer signal which is not intended for the UE of the specific mode even if the higher layer signal is configured according to an existing method other that the methods of Embodiment A or according to Embodiment A. On the other hand, for the higher layer information for the UE of the specific mode, the UE processor may perform descrambling, error detection with the CRC, CRC elimination and/or demodulation of a PDSCH carrying the higher layer information using a new SI-RNTI (e.g., an MTC-SI-RNTI) defined for the specific mode distinguishably from the legacy SI-RNTI based on a UE-RS generated using the new SI-RNTI. The UE processor may apply the new SI-RNTI to a PDCCH carrying scheduling information on the PDSCH. The UE processor may further apply subframe repetition, subframe bundling, and RS density increase to PDSCH transmission for the UE of the specific mode. To this end, the UE processor may control the UE RF unit to receive information indicating subframes over which PDSCH transmission is to be repeated and/or information indicating an RS pattern with an increased density. The UE processor may determine whether the UE is set in the specific mode using Method 1, Method 2, Method 3 and/or Method 4 of Embodiment B. If the UE processor determines that the UE needs to be set in the specific mode, the UE processor may acquire the higher layer signal from a physical channel using a new SI-RNTI, not the legacy SI-RNTI. More specifically, A physical layer (entity) of the UE processor may transport, to the higher layer of the UE processor, a time needed to successfully receive a PSS/SSS, a time needed to successfully receive a PBCH, an RRM result and/or a time needed to successfully receive a specific SIB (e.g., SIB1), and the higher layer of the UE processor may determine whether or not to operate in the specific mode based on the information received from the physical layer. If the higher layer of the UE processor determines that it needs to operate in the specific mode, the higher layer may inform the physical layer of the new SI-RNTI in place of the legacy SI-RNTI. Thereby, the UE processor may acquire the higher layer signal using the new SI-RNTI.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for receiving, by a user equipment, a signal, the method comprising:
   receiving, by the user equipment, a physical broadcast channel (PBCH) carrying a master information block; and
   receiving, by the user equipment, a legacy physical downlink shared channel (PDSCH) carrying a legacy system information block based on downlink control information carried by a physical downlink control channel (PDCCH) when the user equipment is not in coverage enhancement, and receiving, by the user equipment, an enhanced PDSCH carrying an enhanced system information block in each of consecutive downlink subframes based on the master information block when the user equipment is in the coverage enhancement,
   wherein the master information block includes information on a time-frequency resource for reception of the enhanced PDSCH and information on a starting subframe of the consecutive downlink subframes.

2. The method according to claim 1, wherein the master information block further includes information on a downlink bandwidth, information on a physical hybrid ARQ indicator channel (PHICH) configuration and information on a system frame number.

3. The method according to claim 1, wherein the legacy or enhanced system information block is system information block type 1 (SIB1) which contains information relevant when evaluating whether the user equipment is allowed to access a cell and defines scheduling of other system information.

4. The method according to claim 1, further comprising:
   determining, by the user equipment, whether the user equipment is in coverage enhancement based on whether the user equipment receives a synchronization signal successfully within a predefined time duration.

5. The method according to claim 1, further comprising:
   receiving, by the user equipment, the PBCH in an additional subframe as well as in subframe 0 of subframes 0 to 9 in each radio frame when the user equipment is in the coverage enhancement.

6. A user equipment for receiving a signal, the user equipment comprising:
   a radio frequency (RF) unit, and
   a processor configured to control the RF unit to:
   receive a physical broadcast channel (PBCH) carrying a master information block; and
   receive a legacy physical downlink shared channel (PDSCH) carrying a legacy system information block based on downlink control information carried by a physical downlink control channel (PDCCH) when the user equipment is not in coverage enhancement, and receive an enhanced PDSCH carrying an enhanced system information block in each of consecutive downlink subframes based on the master information block when the user equipment is in the coverage enhancement,
   wherein the master information block includes information on a time-frequency resource for reception of the enhanced PDSCH and information on a starting subframe of the consecutive downlink subframes.

7. The user equipment according to claim 6, wherein the master information block further includes information on a downlink bandwidth, information on a physical hybrid ARQ indicator channel (PHICH) configuration and information on a system frame number.

8. The user equipment according to claim 6, wherein the legacy or enhanced system information block is system information block type 1 (SIB1) which contains information relevant when evaluating whether the user equipment is allowed to access a cell and defines scheduling of other system information.

9. The user equipment according to claim 6, wherein the processor is further configured to determine whether the user equipment is in the coverage enhancement based on whether the user equipment receives a synchronization signal successfully within a predefined time duration.

10. The user equipment according to claim 6, wherein the processor is further configured to control the RF unit to receive the PBCH in an additional subframe as well as in subframe 0 of subframes 0 to 9 in each radio frame when the user equipment is in the coverage enhancement.

11. A method for transmitting, by a base station, a signal, the method comprising:
transmitting, by the base station, a physical broadcast channel (PBCH) carrying a master information block;
transmitting, by the base station, a physical downlink control channel (PDCCH) carrying downlink control information; and
transmitting, by the base station, a legacy physical downlink shared channel (PDSCH) carrying a legacy system information block based on the downlink control information, and transmitting, by the base station, an enhanced PDSCH carrying an enhanced system information block in each of consecutive downlink subframes based on the master information block,
wherein the legacy system information block is for a user equipment not in coverage enhancement and the enhanced system information block is for a user equipment in the coverage enhancement, and
wherein the master information block includes information on a time-frequency resource for reception of the enhanced PDSCH and information on a starting subframe of the consecutive downlink subframes.

12. The method according to claim 11, wherein the master information block further includes information on a downlink bandwidth, information on a physical hybrid ARQ indicator channel (PHICH) configuration and information on a system frame number.

13. The method according to claim 11, wherein the legacy or enhanced system information block is system information block type 1 (SIB1) which contains information relevant when evaluating whether the user equipment is allowed to access a cell and defines scheduling of other system information.

14. The method according to claim 11, further comprising:
transmitting, by the base station, the PBCH in an additional subframe for the user equipment in the coverage enhancement as well as in subframe 0 of subframes 0 to 9 in each radio frame.

15. A base station for transmitting a signal, the base station comprising:
a radio frequency (RF) unit, and
a processor configured to control the RF unit to:
transmit a physical broadcast channel (PBCH) carrying a master information block;
transmit a physical downlink control channel (PDCCH) carrying downlink control information; and
transmit a legacy physical downlink shared channel (PDSCH) carrying a legacy system information block based on the downlink control information, and transmit an enhanced PDSCH carrying an enhanced system information block in each of consecutive downlink subframes based on the master information block,
wherein the legacy system information block is for a user equipment not in coverage enhancement and the enhanced system information block is for a user equipment in the coverage enhancement, and
wherein the master information block includes information on a time-frequency resource for reception of the enhanced PDSCH and information on a starting subframe of the consecutive downlink subframes.

16. The base station according to claim 15, wherein the master information block further includes information on a downlink bandwidth, information on a physical hybrid ARQ indicator channel (PHICH) configuration and information on a system frame number.

17. The base station according to claim 15, wherein the legacy or enhanced system information block is system information block type 1 (SIB1) which contains information relevant when evaluating whether the user equipment is allowed to access a cell and defines scheduling of other system information.

18. The base station according to claim 15, wherein the processor is further configured to control the RF unit to transmit the PBCH in an additional subframe for the user equipment in the coverage enhancement as well as in subframe 0 of subframes 0 to 9 in each radio frame.

* * * * *